United States Patent [19]

Yoshida et al.

[11] Patent Number: 5,502,803
[45] Date of Patent: Mar. 26, 1996

[54] INFORMATION PROCESSING APPARATUS HAVING A GESTURE EDITING FUNCTION

[75] Inventors: Hiroichi Yoshida, Nara; Junko Morimura, Gose; Kazuhiko Matsuo, Yamatokoriyama; Kazuhiko Takata, Habikino, all of Japan

[73] Assignee: Sharp Kabushiki Kaisha, Japan

[21] Appl. No.: 181,129

[22] Filed: Jan. 13, 1994

[30] Foreign Application Priority Data

Jan. 18, 1993 [JP] Japan .................................. 5-006097
Feb. 16, 1993 [JP] Japan .................................. 5-026816

[51] Int. Cl.[6] .................................................. G06F 15/62
[52] U.S. Cl. ........................ 395/146; 395/155; 395/161
[58] Field of Search .................................. 395/146, 145, 395/155, 156, 161; 345/156, 157, 162, 179

[56] References Cited

U.S. PATENT DOCUMENTS

| | | | |
|---|---|---|---|
| 5,065,438 | 11/1991 | Hirose et al. . | |
| 5,220,649 | 5/1993 | Forcier | 395/148 |
| 5,231,698 | 7/1993 | Forcier | 395/146 |
| 5,252,951 | 10/1993 | Tannenbaum et al. | 345/156 |
| 5,347,295 | 9/1994 | Agulnick et al. | 345/156 |

FOREIGN PATENT DOCUMENTS

| | | |
|---|---|---|
| 0243925 | 11/1987 | European Pat. Off. . |
| 0394614 | 10/1990 | European Pat. Off. . |
| 51-93830 | 8/1976 | Japan . |
| 62-28828 | 2/1987 | Japan . |
| 62-256023 | 11/1987 | Japan . |
| 3-150625 | 6/1991 | Japan . |
| 2234102 | 1/1991 | United Kingdom . |

OTHER PUBLICATIONS

Patent Abstracts of Japan, vol. 13, No. 499 (P–9570), 10 Nov. 1989, & JP–A–12 000 468 (Fujitsu) 11 Aug. 1989.
Patent Abstracts of Japan, vol. 12, No. 309 (P–748), 23 Aug. 1988 & JP–A–63 078 275 (Fujitsu) 8 Apr. 1988.

*Primary Examiner*—Mark R. Powell
*Assistant Examiner*—U. Chauhan
*Attorney, Agent, or Firm*—Nixon & Vanderhye

[57] ABSTRACT

When a line is drawn on a screen with a coordinate input pen in a specific shape, the shape of the line drawing is collated with a reference stroke stored in a gesture table. As a result, an edit instruction corresponding to the shape of the line drawing is specified and executed. This function is called a gesture editing function. Here, the coordinate system which is the most suitable for computing the editing position on the screen is selected according to a given edit instruction. Thus, displacement of an editing position due to shaking of the user's hand can be avoided, thereby accurately executing the edit instruction. Moreover, the combination between the reference stroke and the edit instruction in the gesture table can be changed as desired by a key-operation according to the use of the user. Thus, a more convenient gesture editing function for the user can be achieved.

23 Claims, 26 Drawing Sheets

RETURN VALUE FROM PEN
X,Y COORDINATES (200,180)
PEN (DOWN)

FIG. 5(a)  FIG. 5(b)  FIG. 5(c)
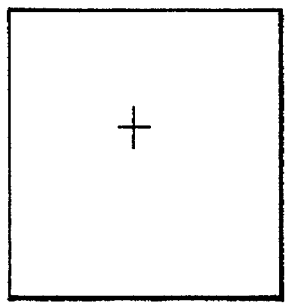
FIG. 5(d)  FIG. 5(e)
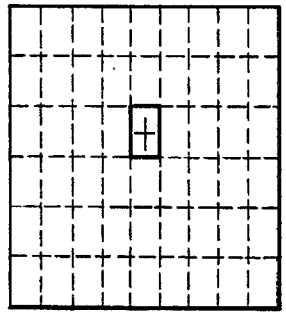 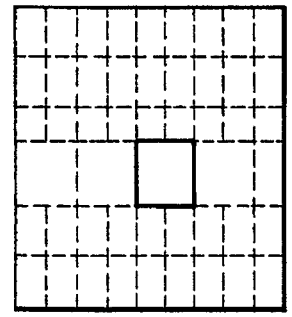

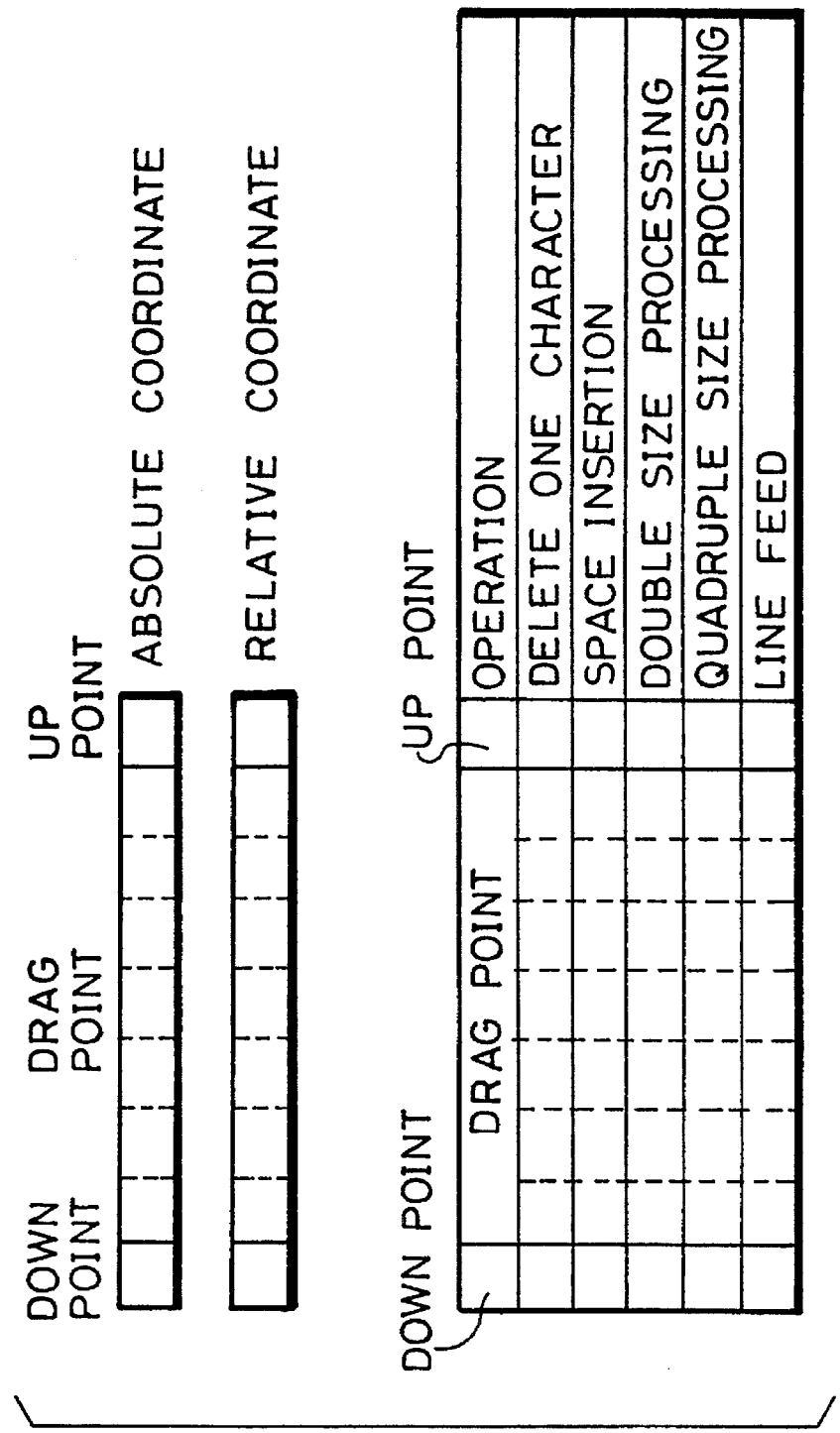

FIG. 7

| REFERENCE STROKE | COMMAND | REFERENCE STROKE | COMMAND |
|---|---|---|---|
| | DELETE ONE CHARACTER | | DELETE PART OF DOCUMENT (AFTER SPECIFYING AREA) |
| | UNDERLINE | | COPY (TO) |
| | SPACE ONE CHARACTER | | MOVE (TO) |
| | SPACE MORE THAN ONE CHARACTER | | PAGE UP |
| | CARRIER RETURN | | PAGE DOWN |
| | CENTER | | HANDWRITTEN ENTRY |
| | ALIGN RIGHT | | RESTORE DELETE |

FIG. 8

| GESTURE | | | |
|---|---|---|---|
| MOVEMENT | EDIT PROCCESING | DIRECTED POINT | COORDINATE SYSTEM |
| | DELETE ONE CHARACTER | DOWN | 1 |
| | INSERT SPACE | DOWN; UP | 2 |
| | DOUBLE SIZE PROCESSING | DOWN | 1 |
| | QUADRUPLE SIZE PROCESSING | DOWN | 1 |
| | LINE FEED | DOWN | 2 |

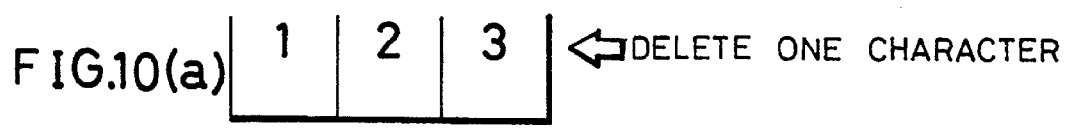
FIG.10(a) ⇐ DELETE ONE CHARACTER
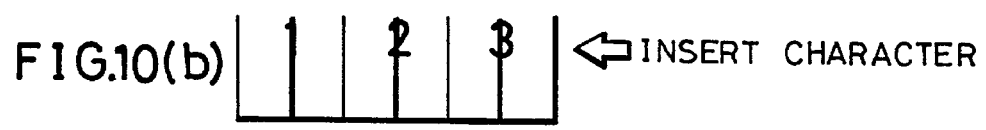
FIG.10(b) ⇐ INSERT CHARACTER
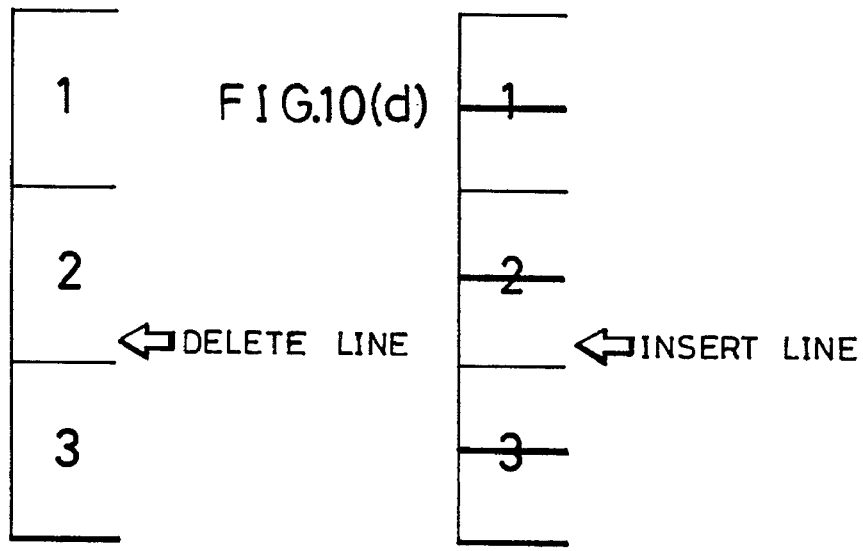
FIG.10(c) ⇐ DELETE LINE    FIG.10(d) ⇐ INSERT LINE

FIG.13(a)

GESTURE OF UNDERLINE (FIRST COORDINATE SYSTEM)

FIG.13(b)

(THIRD COORDINATE SYSTEM)

FIG.13(c)

(FOURTH COORDINATE SYSTEM)

FIG.13(d)

GESTURE OF UNDERLINE (SECOND COORDINATE SYSTEM)

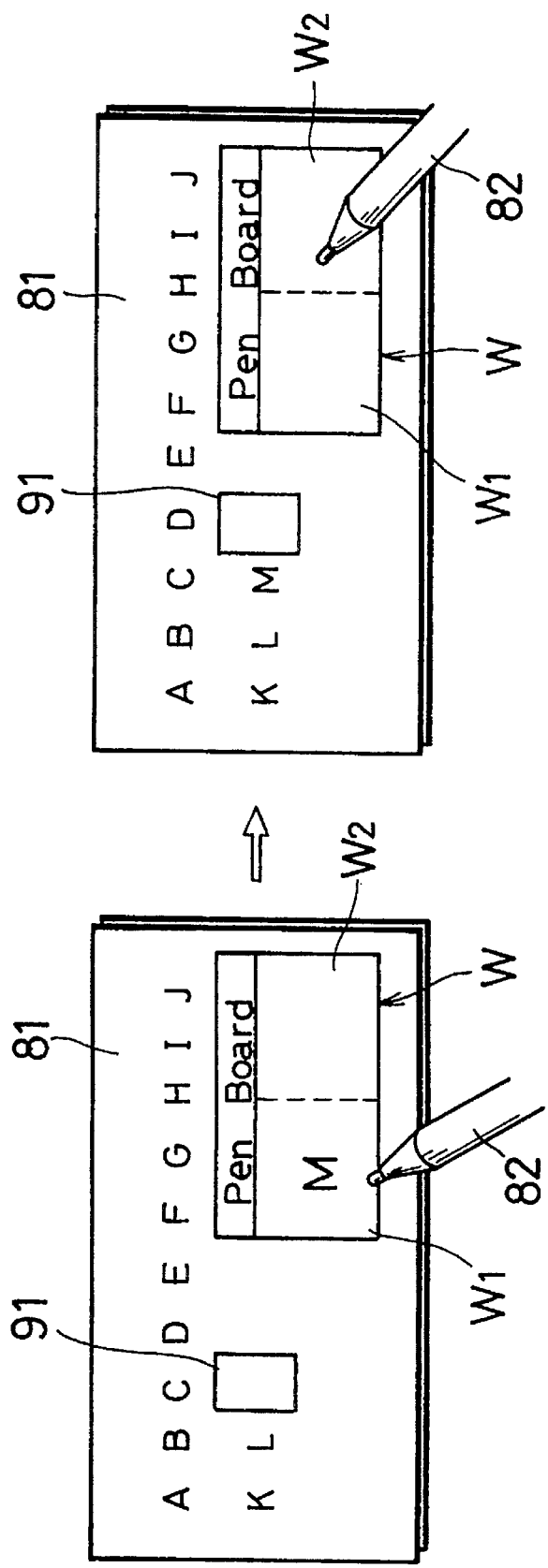

FIG.21(a)

| SET NUMBER | REFERENCE STROKE | COMMAND |
|---|---|---|
| 1 | → | BACKSPACE |
| 2 | ↓ | LINE FEED |
| 3 | ↗ | DELETE |

⇓ SELECT SET NUMBER 1

FIG.21(b)

| ITEM TO BE CHANGED | REFERENCE STROKE | COMMAND |
|---|---|---|
| 1 | ↻ | BACKSPACE |

⇓ CHANGE COMPLETED

FIG.21(c)

| SET NUMBER | REFERENCE STROKE | COMMAND |
|---|---|---|
| 1 | ↻ | BACKSPACE |
| 2 | ↓ | LINE FEED |
| 3 | ↗ | DELETE |

FIG. 22

| XXXXH | FIRST BYTE | SECOND BYTE |
|---|---|---|
| | 0FFH | 00H |
| | 0FFH | 01H |
| | 0FFH | 02H |
| | 0FFH | 03H |
| | 00H | 04H |
| | 00H | 05H |

FIG. 23

XXXXH

| 1byte | |
|---|---|
| 0F0H | ··· "BACKSPACE" |
| 0F1H | ··· "LINE FEED" |
| 0F2H | ··· "DELETE" |
| 0F3H | ··· "DELETE ONE CHARACTER" |
| 0F4H | ··· "SYMBOL INPUT" |
| 0F5H | ··· "CODE INPUT" |

FIG.24(a)

XXXXH

| FIRST BYTE | SECOND BYTE |
|---|---|
| 00H | 0F0H |
| 01H | 0F1H |
| 02H | 0F2H |
| 03H | 0F3H |
| 04H | 0F4H |
| 05H | 0F5H |

⇩ AFTER THE CHANGE

FIG.24(b)

XXXXH

| FIRST BYTE | SECOND BYTE |
|---|---|
| 00H | 0F0H |
| 01H | 0F1H |
| 06H | 0F2H |
| 03H | 0F3H |
| 04H | 0F4H |
| 05H | 0F5H |

← CHANGE REFERENCE STROKE FROM 02H TO 06H 1  2
 ×    — EXAMPLE OF POINTING
3  4

FIG. 29(a)

| XXXXH | FIRST BYTE | SECOND BYTE |
|---|---|---|
| | 00H | 0F0H |
| | 01H | 0F1H |
| | 02H | 0F2H |
| | 03H | 0F3H |
| | 04H | 0F4H |
| | 05H | 0F5H |
| | 06H | 0F6H |

FIG. 29(b)

00H··· PATTERN CODE CORRESPONDING TO TRACE OF PEN 

01H··· PATTERN CODE CORRESPONDING TO TRACE OF PEN 

02H··· PATTERN CODE CORRESPONDING TO TRACE OF PEN 

03H··· PATTERN CODE CORRESPONDING TO TRACE OF PEN 

0F0H··· PROCESSING CODE CORRESPONDING TO PROCESSING "BACKSPACE"

0F1H··· PROCESSING CODE CORRESPONDING TO PROCESSING "LINE FEED"

0F2H··· PROCESSING CODE CORRESPONDING TO PROCESSING "DELETE"

0F3H··· PROCESSING CODE CORRESPONDING TO PROCESSING "DELETE ONE CHARACTER"

INFORMATION PROCESSING APPARATUS HAVING A GESTURE EDITING FUNCTION

FIELD OF THE INVENTION

The present invention relates to an information processing apparatus such as a word processor or a personal computer capable of processing a document, more specifically, relates to an information processing apparatus having a gesture editing function for editing a document using a command which is handwritten on a display screen by means of a pen input device.

BACKGROUND OF THE INVENTION

Conventionally, a mouse has been used as a common pointing device for editing a document in an information processing apparatus such as a word processor or a computer. By moving the mouse on a mouse pad placed on a desk, the user typically controls an on-screen cursor.

FIG. 25 shows a configuration of a conventional document processing apparatus capable of editing by pointing. The conventional document processing apparatus is provided with a keyboard 1a which serves as an input device for inputting characters, etc., a document buffer 2a for storing therein inputted characters or character strings after being edited, a display unit 3a for displaying the inputted characters, etc., on the screen, a CPU 4a for controlling the document processing apparatus, a mouse 5a which serves as a pointing device for specifying an on-screen position, a cursor pointer 6a for storing therein a current cursor position, a document editing section 41a for editing a character or character string corresponding to a specified position and a program memory 7a for storing therein various kinds of application programs for an input process, an edit process by pointing, display process and memory process. In the above apparatus, the program memory 7a is composed of ROM, and the document buffer 2a and the cursor pointer 6a are respectively composed of RAMs.

FIG. 26 schematically shows the configuration of the conventional document processing apparatus capable of editing by pointing. In editing a document which is prepared beforehand by means of a pointing device, by moving the mouse 5a on a mouse pad 51a, a ball in the mouse 5a rotates, and the respective amounts of rotations in X-axis direction and in Y-axis direction are sent to the CPU 4a. The CPU 4a computes the respective amount of movements of the cursor in X-axis direction and Y-axis direction by the respective amounts of rotations and adds the computed amount of movements to the current cursor position so as to renew the cursor position stored in the cursor pointer 6a. On the screen, the cursor disappears from the current position and appears at a new cursor position stored in the cursor pointer 6a.

Alternatively, the cursor may be moved by operating keys in the keyboard 1a so as to specify a specific character or an area on the screen, and an editing process is executed as desired by operating edit keys. As described, for moving the cursor onto the specific character in the document, the mouse 5a or the keyboard 1a has been used.

However, in either case of using the mouse or the keyboard, the cursor cannot be moved instantaneously from a desired current cursor position. Thus, a trailing of a cursor on the screen is required from the current cursor position onto the on-screen character to be edited.

Moreover, another problem is presented in the case of using the mouse. That is, because the user moves the mouse on the desk by looking at an arrow which specifies an on-screen cursor position, it is difficult to bring the arrow precisely on a small character.

As a method for counteracting the above problems, an editing method by gesture-pointing using a pen input tablet has been proposed. Here, a gesture editing function is defined as a function for recognizing an edit instruction corresponding to a shape of a line directly drawn by hand with a pen on a screen provided with a tablet and for executing the edit instruction.

In the above method, the cursor can be moved instantaneously from the current cursor position onto a character to be edited as desired. However, in the case of executing a gesture-editing such as "character insert", "line insert", "underlining", etc., an error is likely to occur due to the unwanted shaking of user's hand. As a result, an area subjected to editing may not be specified correctly, thereby presenting the problem that the corresponding character may not be edited and instead an adjoining character may be edited by mistake.

For example, when specifying a point on the screen with the pen as shown in FIG. 27, which one of the numbers among 1, 2, 3 and 4 is specified is not clear. Specifically, even if the user intends to specify the number 1, the number 2 or the number 3 may be edited if an on-screen point specified by touching with a pen is slightly displaced from the number 1. In practice, since it is difficult to touch precisely on a center of the corresponding character, it is desirably arranged such that even if the point on the screen touched with the pen is slightly displaced from the center of the character, the displacement does not actually affect the editing of the character.

This is the first problem to be solved by the present invention.

FIG. 28 shows the configuration of another information processing apparatus having a gesture editing function. The information processing apparatus is provided with an input processing section 21 for inputting by handwriting, a recognition processing section 22 for recognizing an inputted trace of a pen (input pattern), a judgement processing section 23 for judging a command data corresponding to the recognition pattern based on the resulting recognition (recognition pattern) in the recognition processing section 22, a memory 24 for storing thereon a matching pattern for use in recognizing the input pattern and a command data corresponding to the matching pattern and an output processing section 25 for processing a command based on the command data judged in the judgement processing section 23.

As shown in FIG. 29(a), the memory 24 is provided with a gesture command table for storing therein 2-byte codes in a form of a table. As shown in FIG. 29(b), in the gesture command table, the first byte of the code represents a matching pattern corresponding to the trace of a pen, and the second byte of the code represents a processing code of the command data corresponding to the code of the matching pattern code.

Gesture editing processes in the information processing apparatus will be explained below in reference to the flow chart of FIG. 30.

First, an input process by handwriting is carried out in the input processing section 21 (S31), and coordinate data (input pattern) obtained in the input processing section 21 is temporarily stored in a buffer memory (not shown) (S32). Next, a matching pattern is fetched from the gesture command table (S33), and by comparing the matching pattern with the input pattern in the recognition processing section 22 (S34), whether or not a pattern corresponding to the input pattern (recognition pattern) exists is determined (S35).

If the recognition pattern does not exist in S35, the sequence moves back to S31. On the other hand, if the recognition pattern exists in S35, the sequence moves onto S36 where the command data corresponding to the recognition pattern is determined by searching the gesture command table. Then, the command data judged in the judgement processing section 23 and information indicative of position are output to the output processing section 25 as processing codes (S37). As a result, the output processing section 25 executes a command processing based on the above processing codes (S38), thereby completing the gesture editing process.

However, in the above conventional information processing apparatus having a gesture editing function, an association between each pair of a matching pattern and command data stored in the gesture command table is fixed. Thus, the problem is presented in that because of this fixed association between the trace of a pen and the command to be executed, the user cannot use the gesture editing function as desired according to the use of the user. This is the second problem to be solved by the present invention.

SUMMARY OF THE INVENTION

The first objective of the present invention is to provide an information processing apparatus having a gesture editing function which permits an elimination of errors occurred in handwriting processes by obtaining a precise position of a character to be edited with the selection of an optimal coordinate system according to a given edit instruction corresponding to a shape of a handwritten line drawing on a display screen.

The second objective of the present invention is to provide an information processing apparatus having an improved gesture editing function which permits an association between each pair of a matching pattern for use in collating a shape of a handwritten line drawing on a display screen and an edit instruction to be changed according to the use of the user.

In order to achieve the first object, an information processing apparatus having a gesture editing function of the present invention is characterized by including at least the following means:

(1) a display screen for displaying thereon document information;

(2) position indicating means for indicating a position on the display screen;

(3) position detecting means for detecting a coordinate of a handwritten point or coordinates of a handwritten line drawing on the display screen, the handwritten point or line drawing being drawn using the position indicating means;

(4) first memory means for storing therein a plurality kinds of coordinate systems for computing a position of a displayed character or character string;

(5) second memory means for storing therein reference strokes and edit instructions so as to have an association between each pair of reference stroke and edit instruction;

(6) gesture judging means for judging a given edit instruction based on a result of comparison between a shape of the handwritten line drawing and the reference stroke stored in the second memory means when an editing position for editing the document information is specified by the handwritten line drawing;

(7) position computing means for fetching a coordinate system most suitable for the given edit instruction from the first memory means and for computing a position of a character or character string corresponding to the editing position using coordinates of the handwritten line drawing and the coordinate system; and (8) document editing means for editing a character or character string at a computed position based on the given edit instruction.

In the above arrangement, in editing document information being displayed, a specified position in the document information does not always correspond to a character. For example, a space between adjoining characters may be specified, or a space between adjoining lines may be specified. Therefore, when an on-screen position subjected to editing is specified by the position indicating means, the position computing means selects according to the edit instruction a coordinate system which permits the corresponding position to be specified with the least difficulty, thereby accurately specifying the character or character string corresponding to the position subjected to editing.

In the above arrangement, the second memory means stores reference strokes of specific line drawings and edit instructions so as to have an association between each pair of line drawing and edit instruction. The given edit instruction is judged by the gesture judging means for collating a shape of a handwritten line drawing using a reference stroke.

In the above method, the possibility that an unwanted character or character string is edited due to errors occurred in inputting process by handwriting is eliminated.

In order to achieve the second objective, another information processing apparatus having a gesture editing function in accordance with the present invention is characterized by comprising at least the following means:

(1) a display screen for displaying thereon a document;

(2) display input means for inputting a shape of a handwritten line drawing on the display screen;

(3) memory means for storing therein matching patterns for use in collating an input pattern of the handwritten line drawing inputted by the display input means and edit instructions for editing the document so as to have an association between each pair of a matching pattern and an edit instruction; and (4) set content change means for changing as desired an association between each pair of the matching pattern and the edit instruction in the memory means.

In the above arrangement, the matching patterns stored in the memory means are used in determining an editing instruction which corresponds to the input pattern.

When the edit instruction corresponding to the input pattern is specified, the edit instruction is executed, thereby permitting a so-called gesture editing which is an editing of document by a handwritten line drawing on the display screen.

In the arrangement of the present invention, the association between each pair of the matching pattern and the edit instruction can be changed by the set content change means as desired. Since the user can freely set the association between them, the most convenient association for the user can be obtained.

For a fuller understanding of the nature and advantages of the invention, reference should be made to the ensuing detailed description taken in conjunction with the accompanying drawings.

BRIEF DESCRIPTION OF THE DRAWINGS

FIG. 5(a) is an explanatory view which shows a displayed example of a point specified by pointing.

FIG. 5(b) and FIG. 5(c) are explanatory views which show displayed example of characters specified by pointing.

FIG. 5(d) and FIG. 5(e) are explanatory views which show positions of characters specified by pointing.

FIG. 6 is an explanatory view which shows a format of coordinates of a gesture stored in a cursor pointer.

FIG. 7 is an explanatory view which shows an association between each pair of a reference stroke and a gesture command for gesture editing.

FIG. 8 is an explanatory view which shows gesture information to be stored in RAM in response to a trace of a pen.

FIG. 10(a) through FIG. 10(d) are explanatory views which show allocations of characters with respect to two coordinate systems.

FIG. 13(a) through FIG. 13(d) are explanatory views showing allocations of characters with respect to four coordinate systems.

Figure 17A:
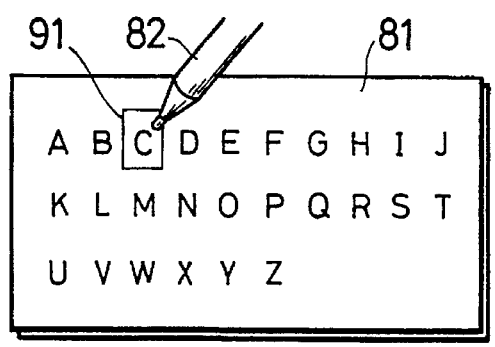
Figure 17B:
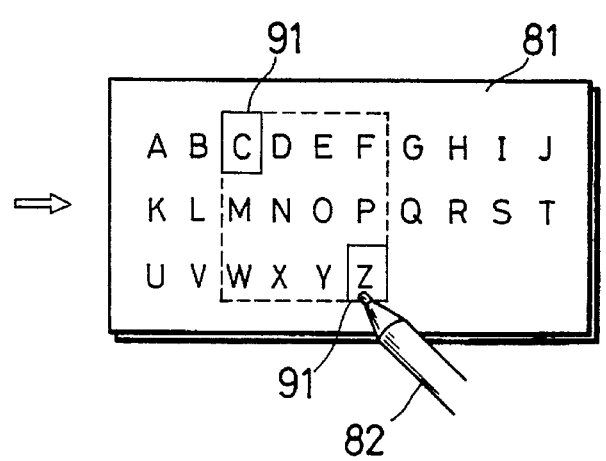

17(a) and FIG. 17(b) are explanatory views which show how an editing area is specified.

FIG. 18(a) and FIG. 18(b) are explanatory views which show examples of input processes of characters by handwriting.

Figure 19:
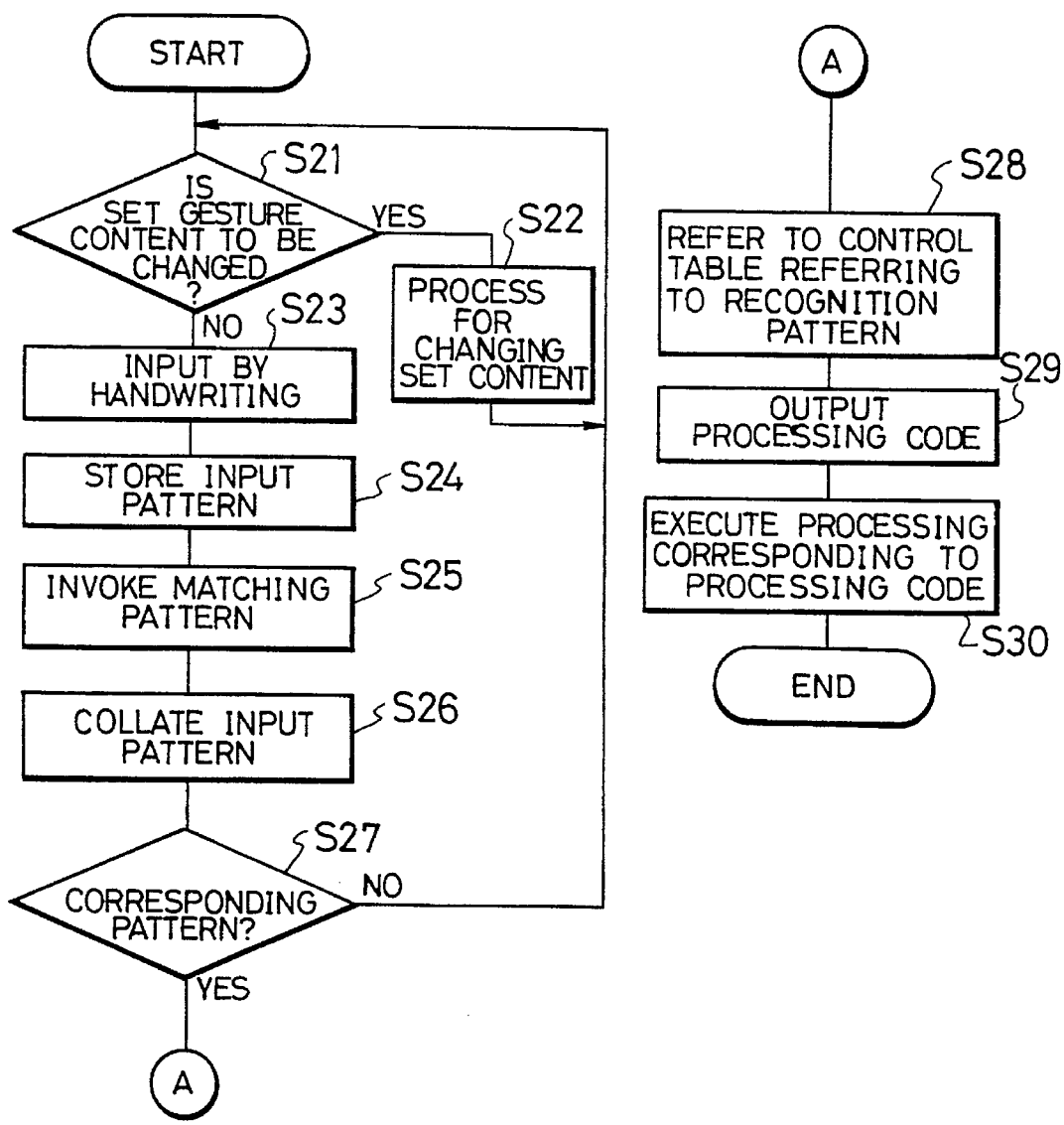

FIG. 19 is a flow chart which shows gesture editing processes in the word processor.

Figure 20:
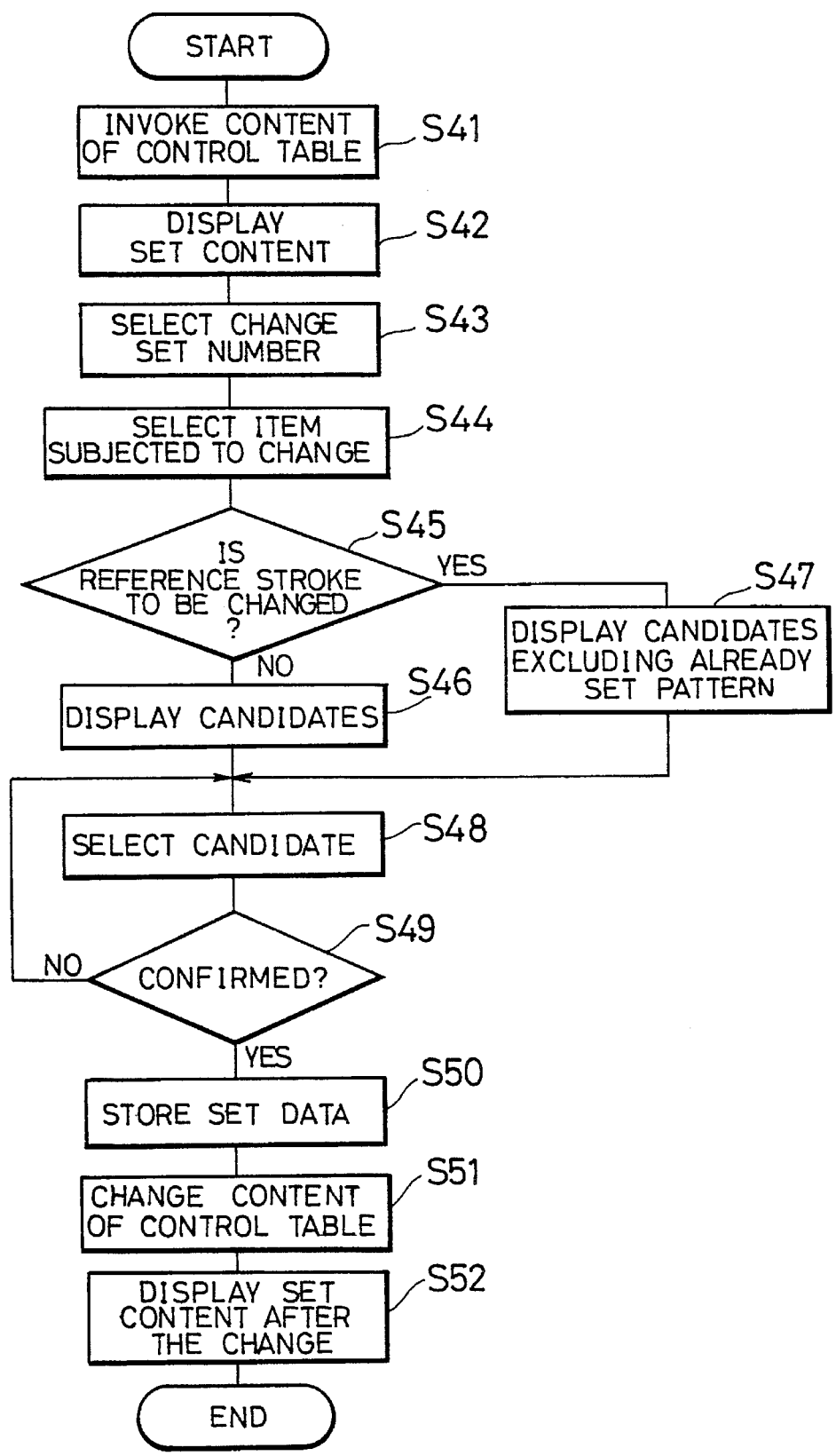

FIG. 20 is a flow chart which shows processes for changing the set gesture using the keyboard of the word processor.

FIG. 21(a) through FIG. 21(c) are explanatory views which show displayed examples of the set content in the process of changing the set content of the gesture.

FIG. 22 is an explanatory view which shows a candidate table for setting a reference stroke in the gesture command table.

FIG. 23 is an explanatory view which shows the candidate table for the command in the gesture command table.

FIG. 24(a) and FIG. 24(b) are explanatory views which show examples of changing the set content of the gesture command table.

Figure 25:
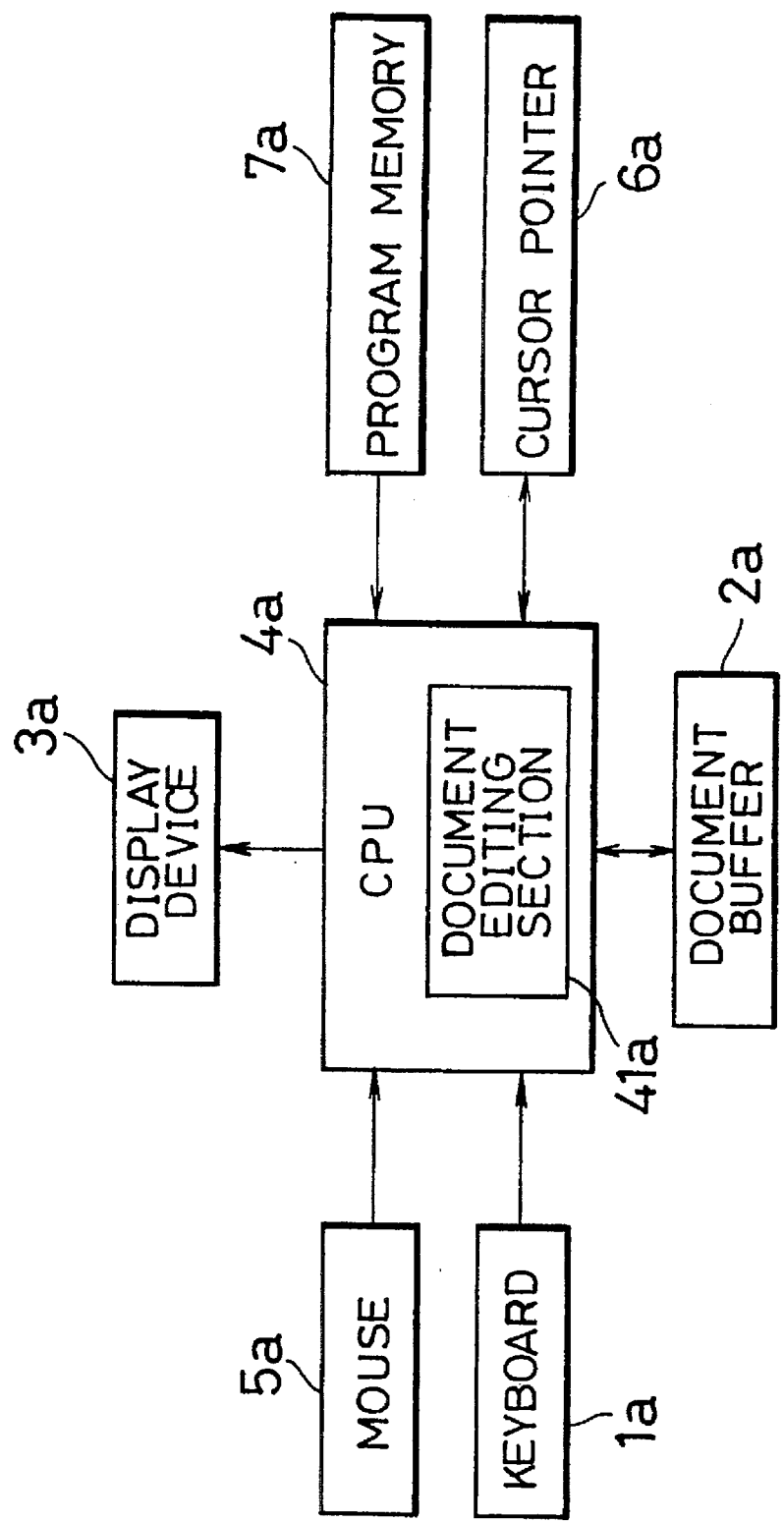

FIG. 25 is a block diagram which shows a basic configuration of a conventional document processing apparatus having an editing function by pointing.

Figures 26, 27:
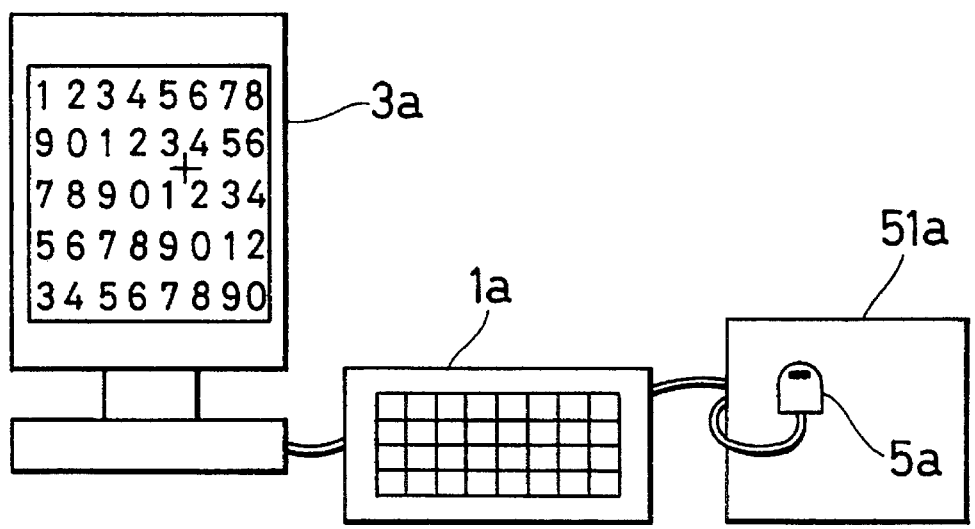

FIG. 26 is an explanatory view which schematically shows an appearance of a conventional document processing device having an editing function by pointing.

FIG. 27 is an explanatory view which shows an example of pointing on a screen in the conventional method.

Figure 28:
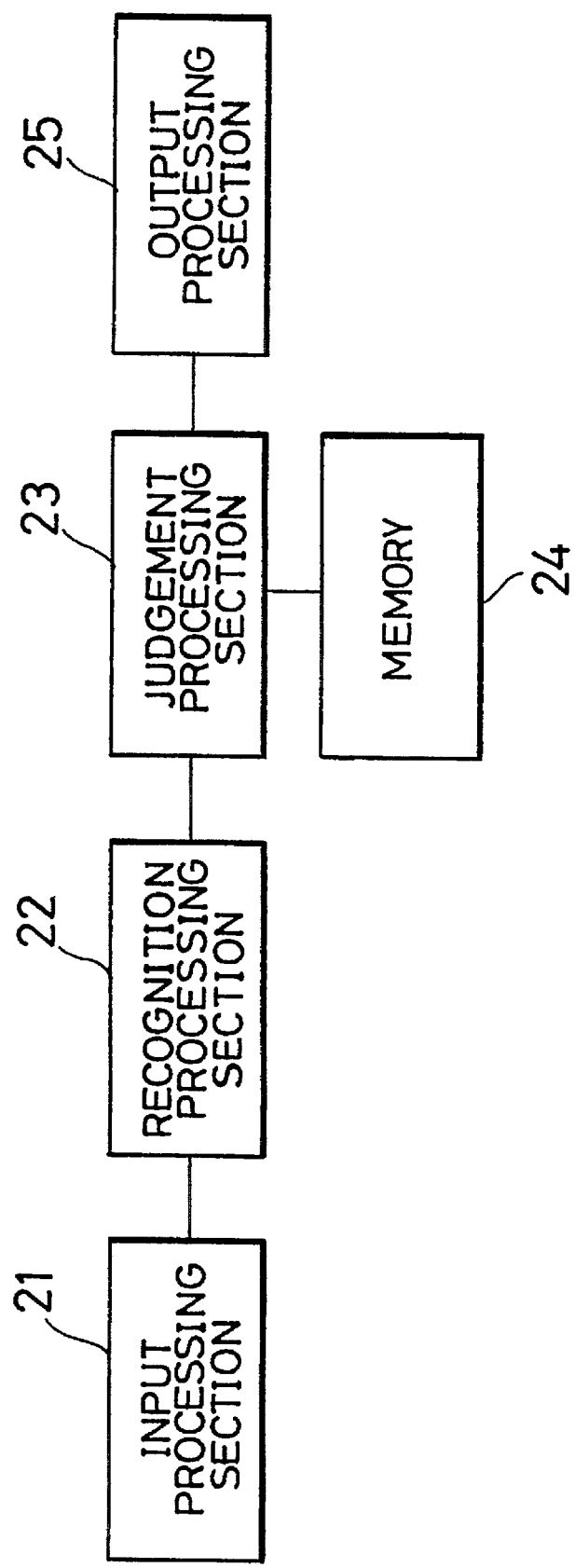

FIG. 28 is a block diagram which shows a basic configuration of a conventional word processor.

FIG. 29(a) is an explanatory view which shows a gesture command table in the word processor.

FIG. 29(b) is an explanatory view which shows each code stored in the gesture command table in the word processor.

Figure 30:
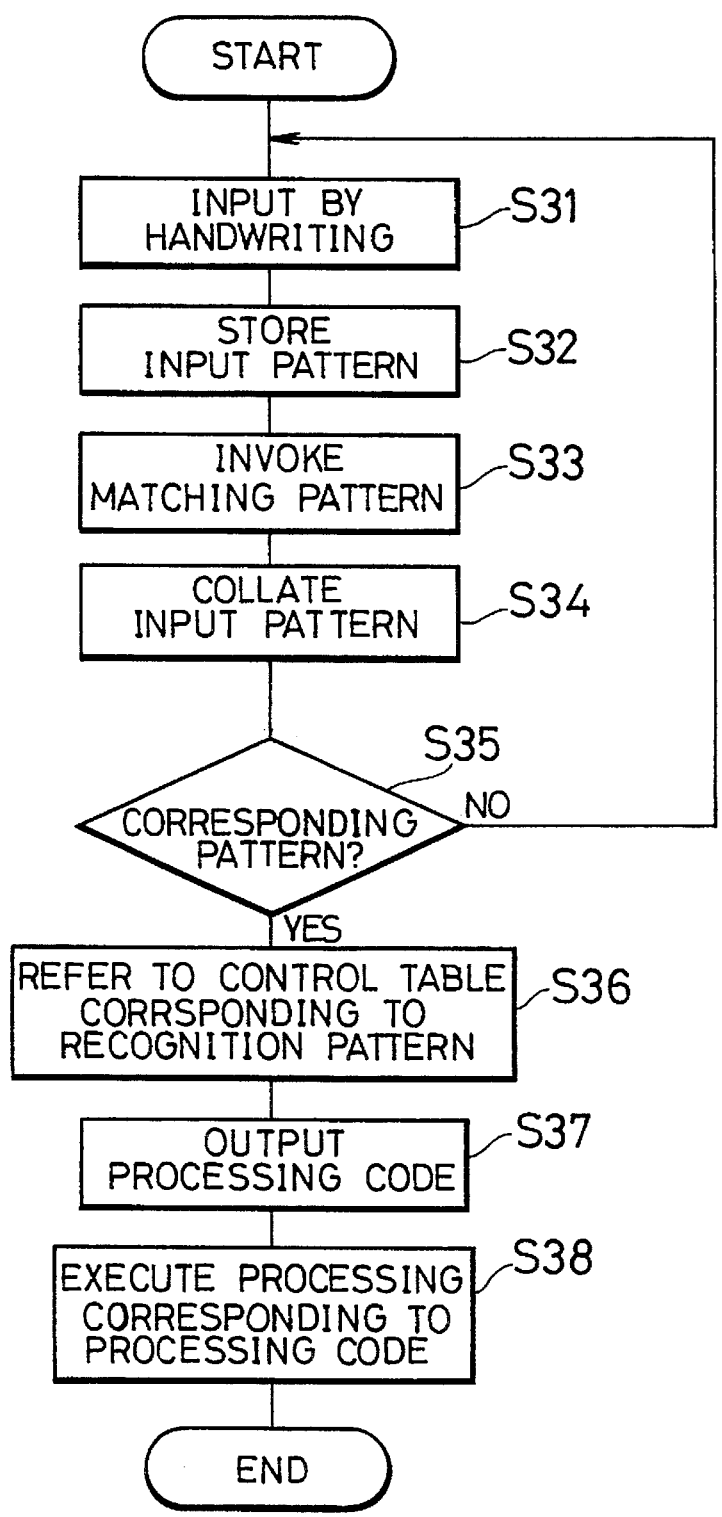

FIG. 30 is a flow chart which shows gesture-editing processes using the word processor.

DESCRIPTION OF THE EMBODIMENTS

The following description will discuss one embodiment of the present invention in reference to FIG. 1 through FIGS. 13(a)–(d).

First of all, the definitions of terms are to be clarified. "Gesture command" is defined as a command for executing an application program prepared for document editing, which serves as a command corresponding to a specific pattern (reference stroke) for use in collating a shape of a handwritten line drawing which is drawn on a screen as an edit instruction. In addition, coordinates of a position of the handwritten line drawing which is drawn on the screen as an edit instruction is hereinafter referred to as a "gesture coordinate", and an input of the edit instruction by drawing lines by hand on the screen is referred to as "gesture input".

Figure 1:
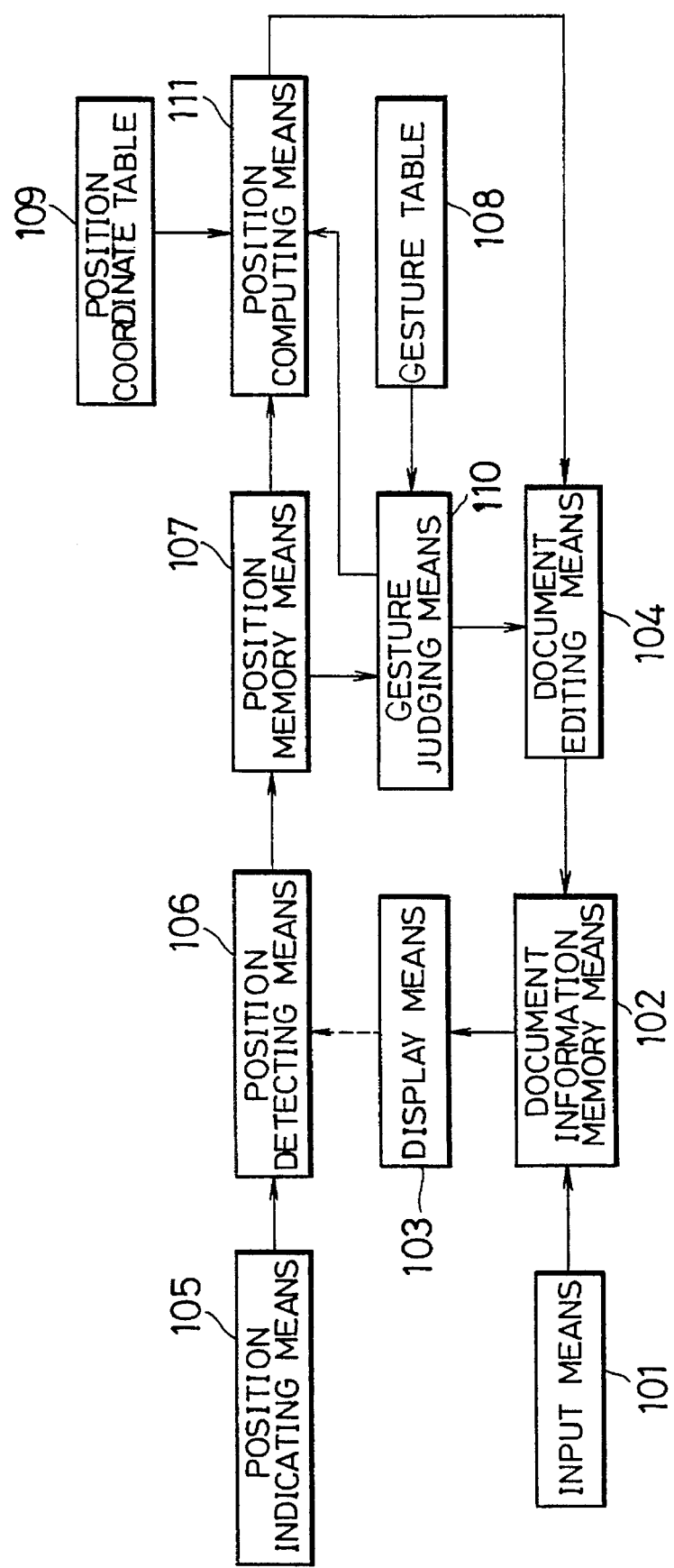
FIG. 1 is a block diagram illustrating a schematic structure of an information processing apparatus having a gesture editing function of the present invention.

The basic configuration of an information processing apparatus having a gesture editing function of the present invention will be explained below in reference to FIG. 1.

The information processing apparatus is composed of the following means as main components:

input means 101 for inputting a document;

document information memory means 102 for storing therein various kinds of document information;

display means 103 for displaying thereon various kinds of document information on the screen; and document editing means 104 for editing the document information.

The above means are provided in generally used document processing apparatus. The document processing apparatus of the present invention is further provided with the following means:

position indicating means 105 for indicating an on-screen position by the gesture input or by pointing, in order to edit the document being displayed on the screen;

position detecting means 106 for detecting the gesture coordinate or a coordinate of a position specified by pointing;

position memory means 107 for storing therein a detected coordinate;

a gesture table 108 for storing therein data of reference strokes corresponding to a various kinds of gesture commands;

a position coordinate table 109 for storing therein character position coordinate systems and space-between-characters position coordinate systems for use in computing position of a character or character string corresponding to a detected coordinate;

gesture judging means 110 for judging a gesture command by comparing the gesture coordinate with data of reference stroke; and position computing means 111 for computing a position of a character or character string corresponding to the gesture input by fetching the character position coordinate system or the space-between-characters position coordinate system from the position coordinate table 109 based on a determined gesture command.

The document editing means 104 edits the character or character string at a position computed by the position computing means 111 based on the determined gesture command.

One of the features of the present invention lies in that a coordinate system which is the most suitable for the determined gesture command is selected by the position computing means 111 so as to compute the actual position of the character or character string.

For the position indicating means 105, a coordinate input pen is preferably used which permits a gesture input which generates a plurality of coordinates representative of a stroke of a handwritten line drawing and also permits a direct pointing on the screen which generates a on-screen point. In this way, characters can be inputted directly on the screen just like when writing characters on a sheet of paper.

The position detecting means 106 is preferably arranged such that a transparent digitizer having a higher resolution than the coordinate system and the screen are formed in one integral part, and so as to detect a position of gesture input or pointing by the position indicating means 105.

The character position coordinate system is slightly displaced from the space-between-characters position coordinate system by a pitch of a half size of the character. It is preferably arranged such that based on document formatting information for editing documents, a character pitch, a character size, a line pitch, etc., are automatically adjusted beforehand.

In the present invention, an input device such as a keyboard or a tablet is used as the input means 101. For the position indicating means 105, a pen input device is used.

For the document information memory means 102, the document editing means 104, the position memory means 107, the gesture table 108, the position coordinate table 109, the gesture judging means 110 and the position calculating means 111, microcomputers composed of CPU, ROM, RAM and an I/O port are respectively used.

Normally, the RAM is used especially for the document information memory means 102 and the position memory means 107, and the ROM is used especially for the gesture table 108 and the position coordinate table 109.

For the display 103, CRT (Cathode Ray Tube) display device, LCD (Liquid Crystal Display) device, EL (Electro Luminescence) display device, etc., may be used.

The following description will discuss one embodiment of the information processing apparatus of the present invention. The present invention is suitably applicable to the word processor and electric note device having a gesture editing function, and the components of the device as listed below are provided not only for permitting the functions provided with the present invention but also for permitting the functions provided with the generally used word processor.

Figure 2:
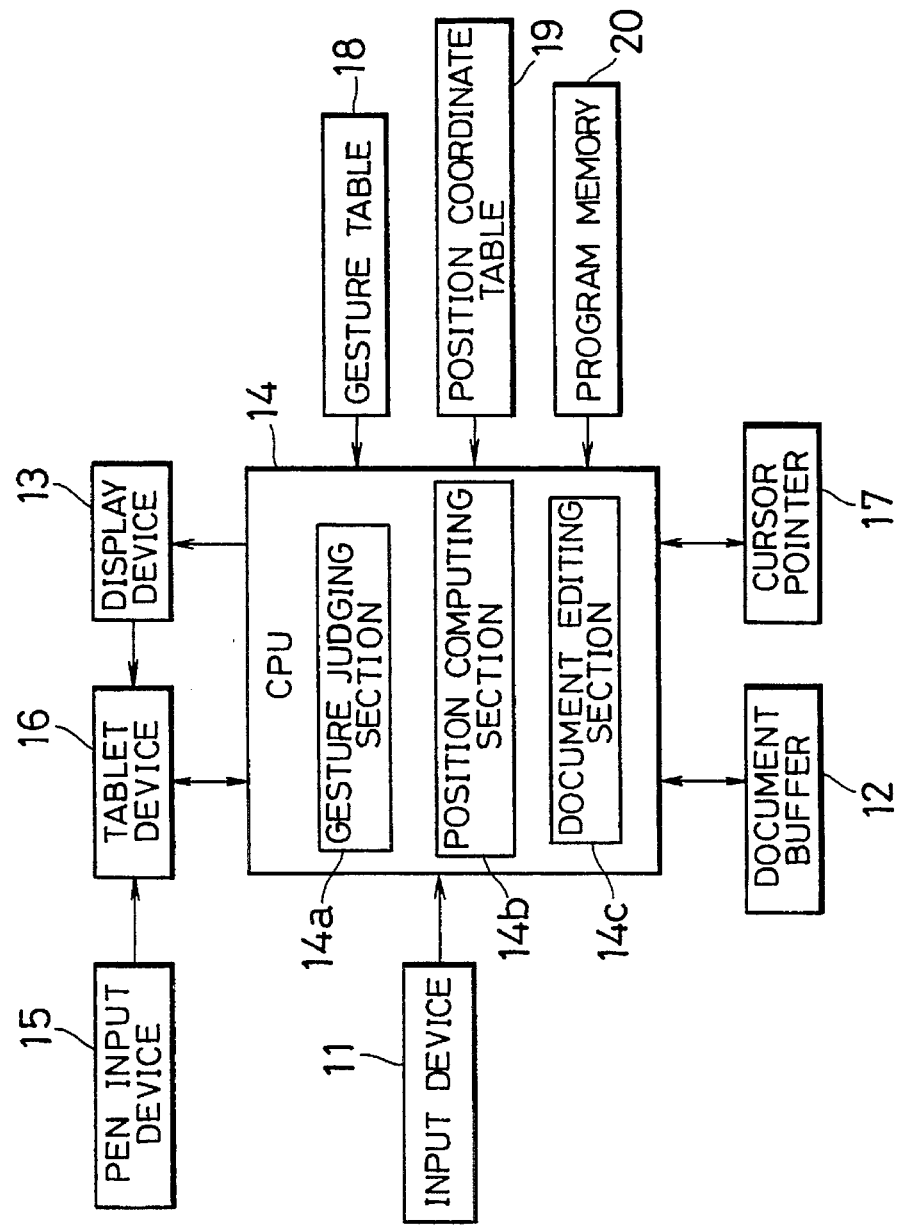
FIG. 2 is a block diagram illustrating a structure of essential sections of the information processing apparatus having a gesture editing function of FIG. 1.

As shown in FIG. 2, the information processing apparatus having a gesture editing function of the present invention is provided with an input device 11 such as a keyboard for inputting characters or other kinds of information, a document buffer 12 for storing therein inputted character or character string after being edited, a display unit 13 for displaying thereon characters or other kinds of information on the screen, a CPU 14 for controlling the information processing apparatus, a pen input device 15 for specifying an on-screen position by pointing and for inputting information by handwriting, a tablet device 16 which is integrally provided with the screen of the display device 13, a cursor pointer 17 for storing therein coordinates, a gesture table 18 for storing therein data of various gesture commands and the corresponding data of reference strokes, a position coordinate table 19 for storing therein the character position coordinate systems and the space-between-characters position coordinate systems and a program memory 20 for storing therein various kinds of application programs.

The tablet 16 is, for example, a transparent digitizer having a high resolution of an electrostatic induction system or electromagnetic induction system. The coordinates to be stored in the cursor pointer 17 include the coordinate of a position specified by pointing, the gesture coordinate and the coordinate of current on-screen cursor position. Additionally, the character position coordinate system and the space-between-characters position coordinate system are used in computing the position of the character or character string corresponding to the detected coordinate.

The CPU 14 is further provided with a gesture judging section 14a, a position computing section 14b and a document editing section 14c. The gesture judging section 14a determines a given gesture command by comparing the gesture coordinate with the data of the reference stroke stored in the gesture table 18. Based on the determined gesture command, the position computing section 14b refers to the character position coordinate system and the space-between-characters position coordinate system stored in the position coordinate table 19 according to the gesture command in order to compute the position of the character or character string corresponding to the gesture coordinate. The document editing section 14c edits the character or character string corresponding to the position computed by the position computing section 14b based on the determined gesture command.

The document buffer 12 and the cursor pointer 17 are respectively composed of RAMs. Additionally, the gesture table 18 is composed of the ROM which stores therein the data of reference strokes and the gesture commands. The position coordinate table 19 is composed of the ROM which stores therein a constant of each coordinate system, etc. The program memory 20 is composed of the ROM which stores therein application programs for respectively activating the gesture judging section 14a, the position computing section 14b and the document editing section 14c. The program memory 20 is activated together with the CPU 14.

Figure 3:
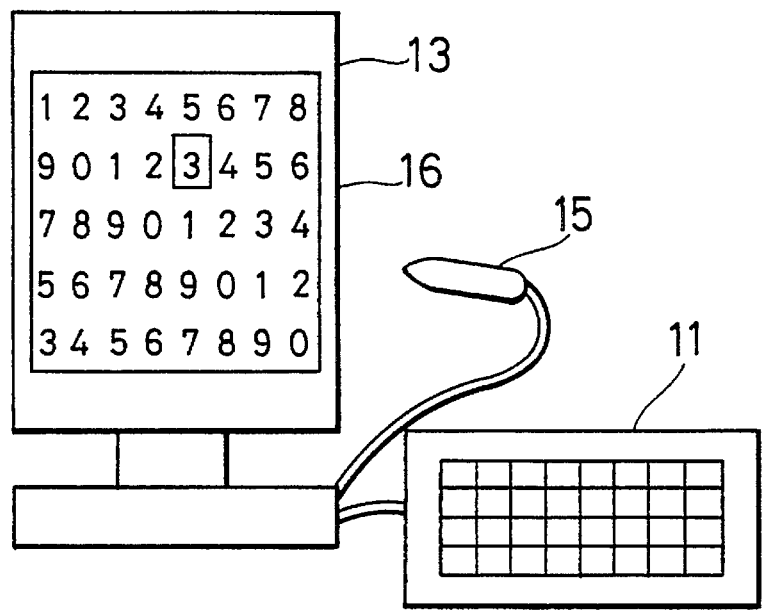
FIG. 3 is an explanatory view schematically illustrating an appearance of the information processing apparatus having a gesture editing function of FIG. 1.

FIG. 3 schematically shows an appearance of the information processing apparatus having a gesture editing function of the present invention. When the tablet device 16 provided on the screen of the display device 13 is pressed with a pen input device 15, X and Y coordinates and the state of the switch of the pen input device 15 are sent to the CPU 14. Then, the position computing section 14b computes the position of the character from X and Y coordinates together with the CPU 14 and renews the coordinate stored in the cursor pointer 17. On the screen, the cursor disappears from the current position, and appears at the position corresponding to the newly stored coordinate in the cursor pointer 17.

The gesture judging section 14a judges the switching between the gesture coordinate including respective coordinates of a down-point, drag points and an up-point and a coordinate of a specified point by pointing without a trace. Here, the down-point indicates an on-screen point touched with the pen input device 15, and the up-point indicates a point at which the pen input device 15 is released from the screen. The drag points indicate a group of points on a line connecting the down-point and the up-point. When the gesture judging section 14a recognizes the pointing, it outputs only information indicative of position to the document editing section 14c without referring to the gesture table 18.

When the gesture judging section 14a recognizes the gesture input, the position of a character or character string corresponding to the gesture coordinate is computed in reference to the gesture table 18.

Figure 4:
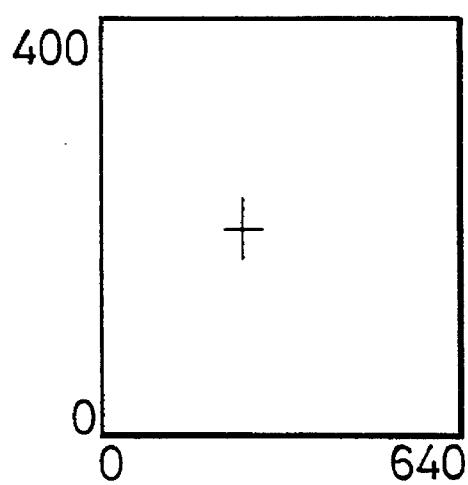
FIG. 4 is an explanatory view illustrating an association between a pointing with a pen on the screen and a coordinate.

FIG. 4 shows an association between an on-screen point specified by pointing with a pen and a coordinate value. For example, in computing the coordinate value, the left and bottom end corner of the screen is set at (X, Y)=(0, 0). Here, the coordinate value is a value returned to the CPU 14 as the pen is putting down on and lifting up from the screen. For example, in FIG. 4, the coordinate value of the down-point indicates that (X, Y)= (200, 180). Here, the X-axis direction indicates a direction of row of the document displayed on the screen, and the Y-axis direction indicates a direction of column of the document.

FIG. 5(b) and FIG. 5(c) show examples of pointing with respect to a normal size character or a quadruple size character with a pen. The position computing section 14b computes the position of the character from the coordinate value of the down-point shown in FIG. 5(a). As shown in FIG. 5(d), the position computing section 14b computes each coordinate value by the respective number of dots in the X-axis direction and Y-axis direction of the character, the number of dots between adjoining characters and the number of dots between adjoining lines so as to determine a character which corresponds to a specified position by pointing with a pen (pen input device 15).

When pointing the position on a double-size character or quadruple-size character, the number of columns in the X-axis direction and the number of rows in the Y-axis direction of the character are required to be adjusted before executing the computing. For example, in the case of the double-size character, the number of rows in the double-size character is converted into the number of rows of two normal-size characters before executing the computing. As shown in FIG. 5(e), in the case of the quadruple-size character, the respective numbers of rows and columns in the quadruple-size character are converted into the number of rows and columns of two normal-size characters before executing the computing.

FIG. 6 shows a format of the gesture coordinate to be stored in the cursor pointer 17. The cursor pointer 17 stores therein the gesture coordinate, i.e., the respective coordinates of the down-point, the drag points and the up-point according to the format shown in FIG. 6. Therefore, the cursor pointer 17 stores therein absolute coordinates. The absolute coordinates are converted in the normalized relative coordinates using the down-point as a standard. Then, the gesture judging section 14a compares the data of reference stroke stored in the gesture table 18 and the relative coordinate so as to determine the gesture command corresponding to the gesture input. The coordinate value in accordance with the above system is stored in a predetermined area which is provided in the cursor pointer 17 in the RAM.

FIG. 7 shows an association between each pair of the reference stroke and the gesture command. The pen input device 15 draws lines on the tablet device 16 in shapes similar to the line drawings of the reference stroke, thereby executing the respective edit instructions.

FIG. 8 shows editing processes corresponding to the movement of a pen, the specified point and the coordinate system. The specified point indicates the character subjected to the editing process when the position of editing and the gesture command are confirmed. The absolute value of the down-point stored in the cursor pointer 17 is fetched as an indicated point. In the case of "space insertion", the absolute coordinate of the up-point is also fetched. The coordinate system used in computing the position of the character is confirmed in the position computing section 14b. The above gesture information is stored in a gesture information area in the RAM.

Figure 9:
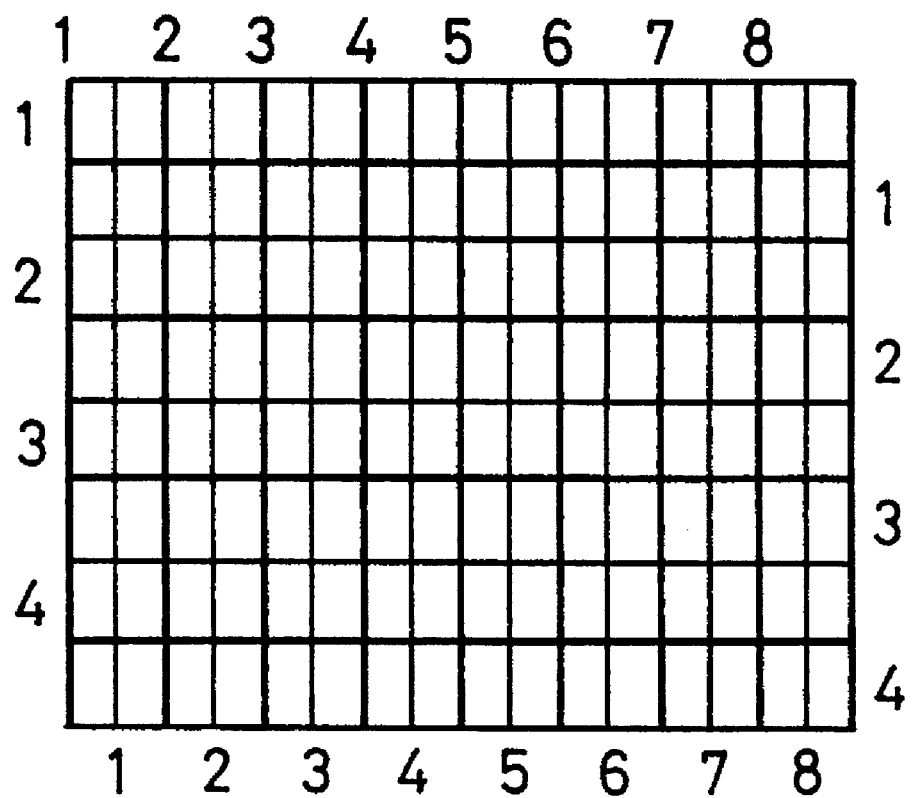
FIG. 9 is an explanatory view which visually shows character position coordinate systems and space-between-characters position coordinate systems stored in a position coordinate table.

FIG. 9 shows the character position coordinate system and the space-between-characters position coordinate system stored in the position coordinate table 19. In FIG. 9, a thin solid line indicates character position coordinate system, and a thick solid line indicates the space-between-characters position coordinate system. The character position coordinate system has the same positional relationship as characters. However, the-space between-characters position coordinate system has a positional relationship which is displaced from that of characters by a half size of character.

FIG. 10(a) through FIG. 10(d) show relative positions of characters in the above two coordinate systems. As shown in FIG. 10(a) through FIG. 10(d), an appropriate coordinate system is selected in the position computing section 14b according to the confirmed gesture command, and the character position is computed.

Specifically, when a character itself is subjected to editing, for example, in the case of one character deletion, it is necessary to arrange such that even if the down-point indicative of character to be deleted is slightly displaced from the precise position of the character, the character can be specified correctly. Therefore, as shown in FIG. 10(a), in order to set the peripheral portion of the character to be considered as the same position as the center of the character, the character position coordinate system is selected. Namely, in the character position coordinate system, one coordinate value is defined for a predetermined area including each character.

On the other hand, when the space-between-characters is subjected to editing, for example, in the case of character insertion, as shown in FIG. 10(b), in order to set the space-between-characters to be considered as the same position as the center of the space, the space-between-characters position coordinate system is selected. Namely, in the space-between-characters position coordinate system, one coordinate value is defined for each space between characters.

In the case of editing in Y-direction such as a line deletion or line insertion, the character position coordinate system or the space-between-characters position coordinate system is selected as in the same manner as the previous case of editing in X-direction. More concretely, as shown in FIG. 10(c), in the case of line deletion, in order to indicate a predetermined area in Y-direction including each character by the same coordinate value, the character position coordinate system is selected. Similarly, as shown in FIG. 10(d), in the case of line insertion, in order to indicate the space-between-lines by the same coordinate value, the space-between-characters position coordinate system is selected.

Therefore, the character position coordinate system and the space-between-characters position coordinate system are prepared both with respect to X-direction and Y-direction. Therefore, with the above combinations of the character position coordinate system and the space-between-characters position coordinate system, the coordinate system can be selected from four coordinates systems, i.e., from the first coordinate system through the fourth coordinate system.

For example, in the case of gesture input which underlines characters, the selection of the second coordinate system shown in FIG. 13(d) is preferable to the selection of the first coordinate shown in FIG. 13(a) by permitting an easier positioning of underlining. This is because if the first coordinate system is selected, not only the number "2" but also adjoining number "1" or "3" may be underlined by mistake when unwanted shaking of the user's hand occurs. Here, in the first coordinate system, the character position coordinate system is applied to the X and Y coordinates. On the other hand, in the second coordinate system, the space-between-characters position coordinate system is applied to the X and Y coordinates.

Further, depending on the edit instruction, as shown in FIG. 13(b) and FIG. 13(c), either the third coordinate system or the fourth coordinate system may be selected. In the third coordinate system, the space-between-characters position coordinate system is applied to the X coordinate, and the character position coordinate system is applied to the Y coordinate. Similarly, in the fourth coordinate system, the character position coordinate system is applied to the X coordinate, and the space-between-characters position coordinate system is applied to the Y coordinate. For example, in the case of character insertion, in order to set the down-point of the gesture input to be easily recognized between characters, the third coordinate system is selected.

Thus, in response to the gesture command determined in the gesture judging section 14a, an appropriate coordinate system is selected by the position computing section 14b, so as to compute the position of the character.

Figure 11:
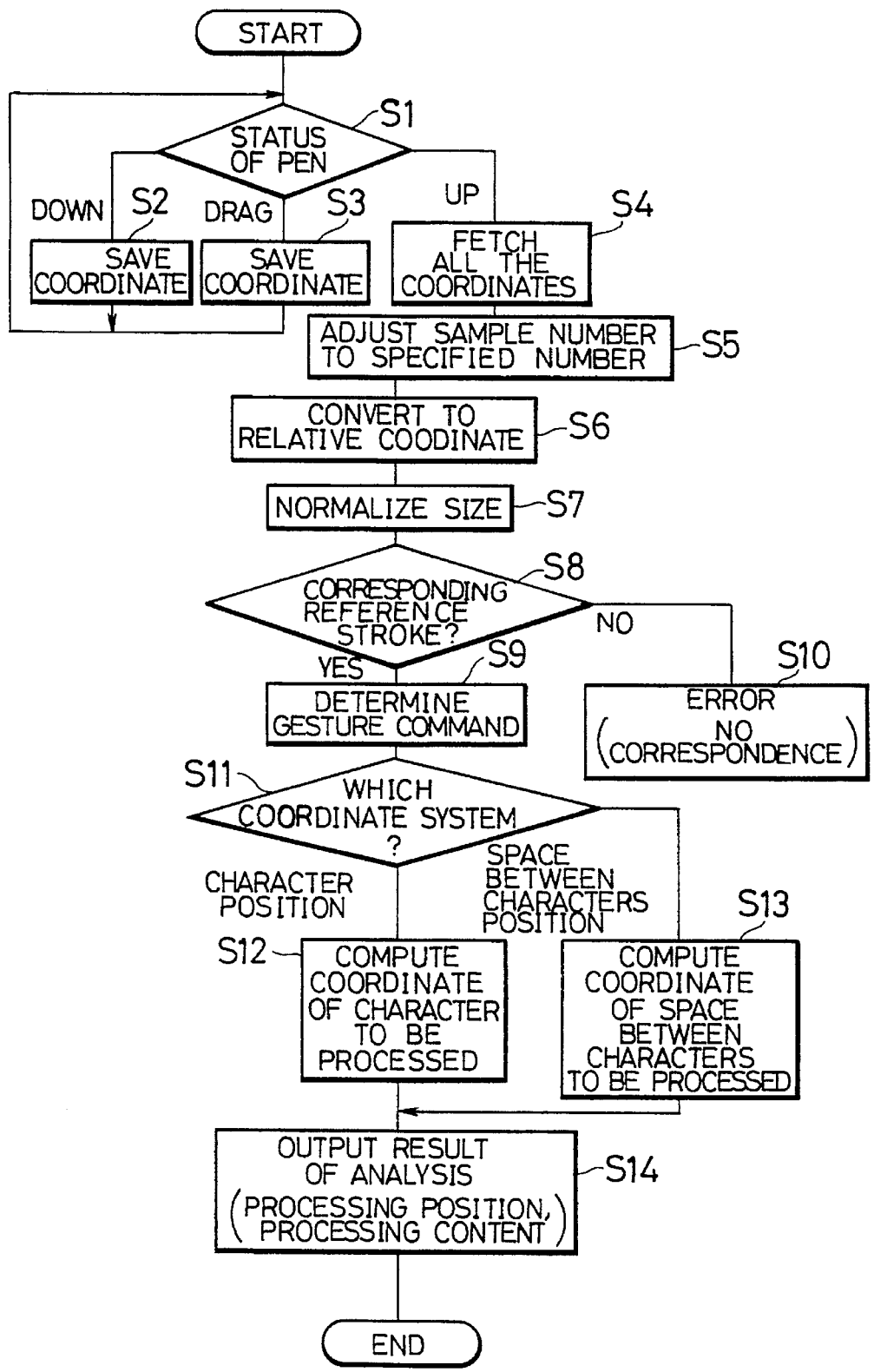
FIG. 11 is a flow chart which shows a process for gesture editing of the present invention.

The processes for gesture-editing of the present invention will be explained below in reference to FIG. 11. Hereinafter, step is referred to as S.

S1: It is determined whether or not an output from the tablet device 16 exists.

S2: When a pen is put down (pen-down) on the tablet device 16, the coordinate corresponding to the pressed position is stored in the cursor pointer 17 as a down-point.

S3: The coordinates of a trace of a pen are stored successively in the cursor pointer 17 as drag points.

S4: When the pen is released from the tablet device 16 (pen-up), the coordinate of a point at which the pen is released from the tablet device 16 is stored in the cursor pointer 17 as an up-point, and in the meantime, all the coordinates from the down-point to the up-point are fetched as samples.

S5: When the sample number is greater than a specified number, the sample number is reduced to the specified number, and on the contrary, when the sample number is smaller than the specified number, more samples are added until the sample number becomes equal to the specified number. Here, the specified number is the same as the number of data of reference strokes stored in the gesture table 8.

S6 and S7: The coordinates of the sample number which is set coincided with the specified number are converted to the relative coordinates which are normalized using the down-point as a standard.

S8: The gesture judging section 14a compares the relative coordinate with the data of the reference stroke so as to analyze which reference stroke has the least difference between the relative coordinates and the data of the reference stroke.

S9: The gesture command is determined.

S10: If no reference stroke corresponding to the relative coordinate is found, it is processed as an error.

S11: According to the determined gesture command, either the character position coordinate system or the space-between-characters position coordinate system is determined.

S12 and S13: The position computing section 14b determines the actual position of the character by computing the coordinate value of the character or the space-between-characters according to the determined coordinate system.

S14: The document editing section 14c carries out the application process by applying the gesture command to the actual character position.

The gesture command is determined in the described manner, and based on the determined gesture command, it is switched between the character position coordinate system and the space-between-characters position coordinate system, and the actual position of the character or character string is computed, thereby permitting an accurate editing of the character or character string.

Figure 12:
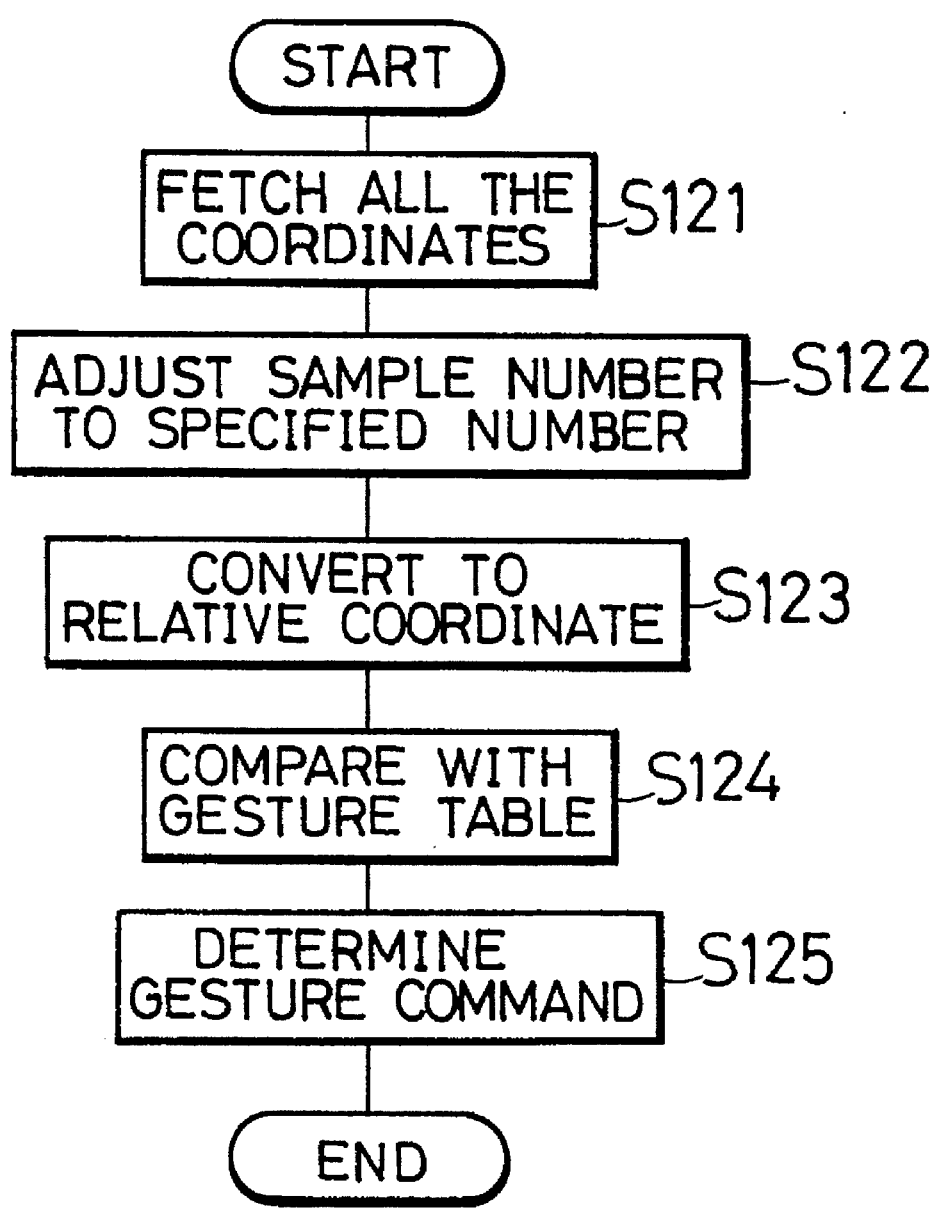
FIG. 12 is a sub flow chart which shows recognizing process of a gesture command.

Lastly, the process for determining the gesture command will be explained below in reference to the sub flow chart of FIG. 12.

S121: All the coordinates from the down-point to the up-point of the pen are fetched.

S122: If the sample number is too large, the sample number is reduced to the specified number, and on the contrary, if the sample number is too small, more samples are added until the sample number becomes equal to the specified number.

S123: The coordinates are converted into the relative coordinate with the down-point as a standard;

S124: Refer to the gesture command table 18.

S125: The reference stroke having the least difference between the relative coordinate and the data of reference stroke is analyzed so as to determine the gesture command.

The following description will discuss another embodiment of the present invention in reference to FIG. 14 through FIGS. 24(a) and 24(b). In the present embodiment, an explanation will be given through the case where the information processing apparatus of the present invention is applied to a word processor.

Figure 14:
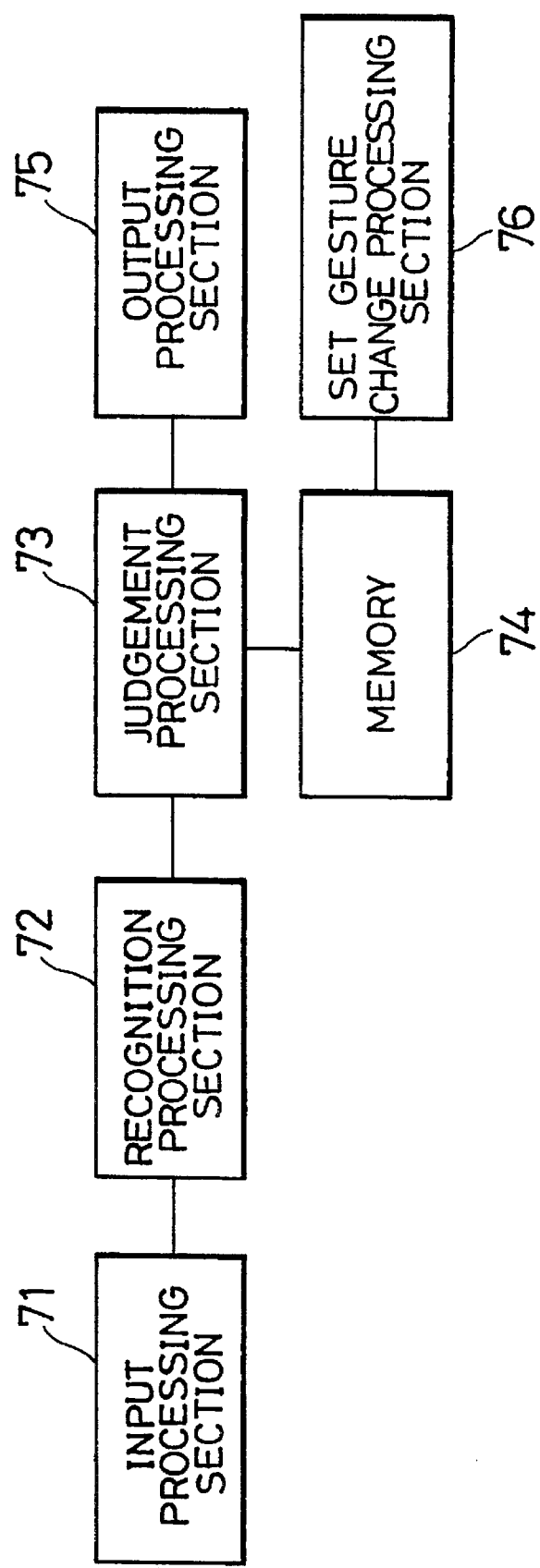
FIG. 14 is a block diagram which shows a basic configuration of a word processor of the second embodiment of the present invention.

As shown in FIG. 14, the word processor of the present embodiment is composed of an input processing section 71 (display input means) for inputting a trace of a pen on a display screen as an input pattern, a recognition processing section 72 (recognizing means) for recognizing an input pattern which is inputted from the input processing section 71, a judgement processing section 73 (recognizing means) for judging a command data for gesture-editing corresponding to a recognition pattern based of a result of recognition in the recognition processing section 72, i.e., the recognition pattern, a memory 74 for storing therein a matching pattern used in recognizing the input pattern and command data corresponding to the matching pattern, an output processing section 75 (document editing means) for executing the process for the gesture command based on the command data determined in the judgement processing section 73 and a set gesture-content change processing section 76 (set content change means) for changing an association between each pair of the matching pattern and the command data stored in the memory 74 according to the use of the user.

Here, the matching pattern corresponds to the reference stroke in the first embodiment.

Figure 15:
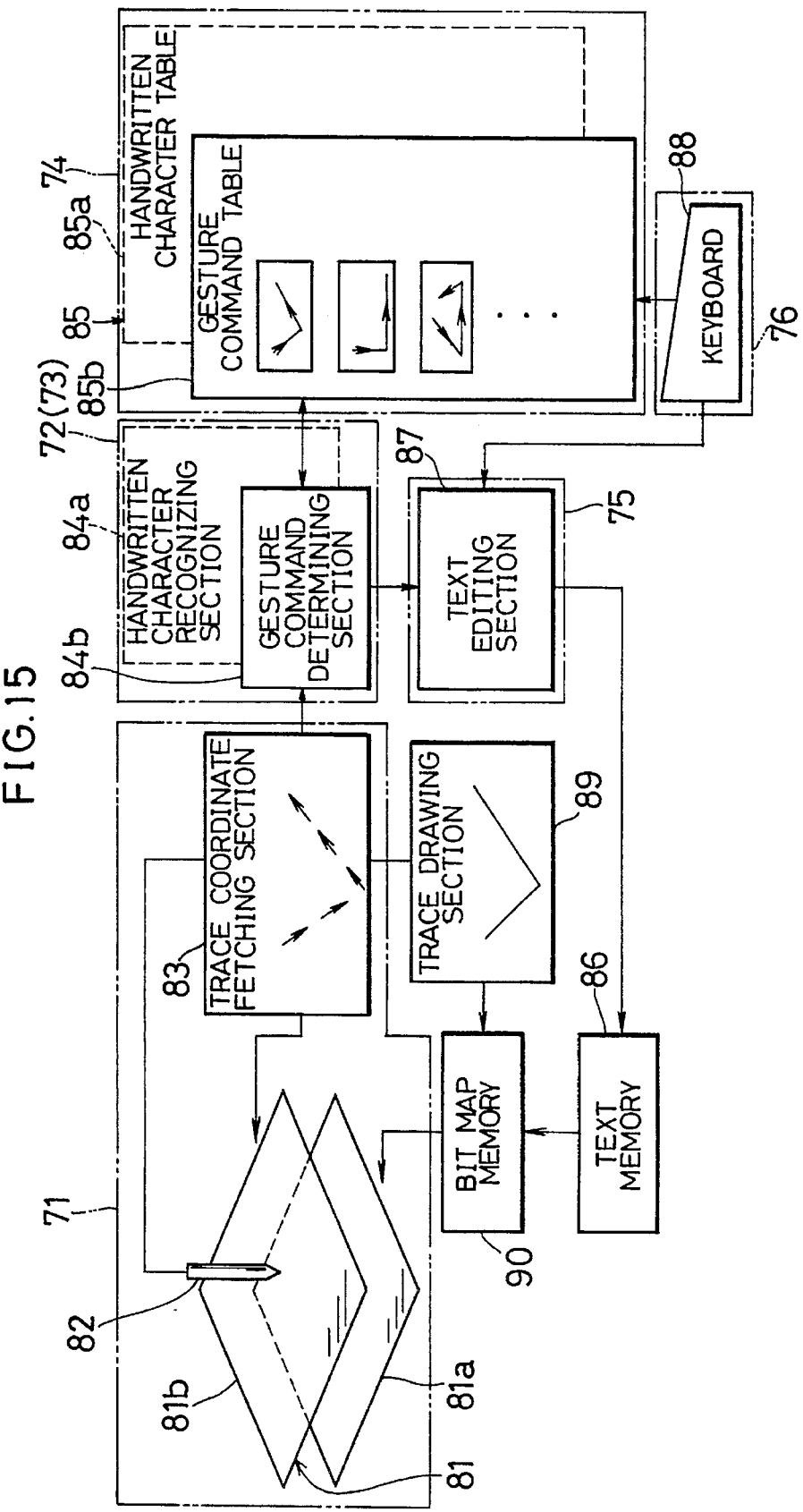
FIG. 15 is a block diagram which shows the basic configuration of FIG. 14 in more detail.

As shown in FIG. 15, the input processing section 71 is provided with a display tablet 81 which is composed of a display 81a and a transparent tablet 81b which are formed in one integral part, a coordinate input pen 82 which is to be operated by the user for inputting a coordinate with respect to the screen of the display tablet 81 and a trace coordinate fetching section 83 for fetching coordinates of the trace of the coordinate input pen 82 in order.

The recognition processing section 72 and the judgement processing section 73 are respectively composed of a handwritten character recognizing section 84a and a gesture command judging section 84b. The handwritten character recognizing section 84a confirms a corresponding character code by collating the coordinate data fetched in the trace coordinate fetching section 83 with the matching pattern stored in a handwritten character table 85a (to be described later). The gesture command determining section 84b confirms a corresponding matching pattern by collating the coordinate data fetched in the trace coordinate fetching section 83 with a matching pattern in a gesture command table 85b (to be described later) and further determines the command data which corresponds to the matching pattern.

The handwritten character recognizing section 84a outputs a corresponding character code to the output processing section 75 as a result of confirmation. On the other hand, the gesture command determining section 84b outputs determined command data to the output processing section 75 as a result of determination as a processing code and information indicative of the position to the output processing section 75.

The memory 74 is provided with a control table 85 composed of the handwritten character table 85a for storing therein matching patterns for handwritten characters and a gesture command table 85b for storing therein matching patterns for gesture commands. As explained in reference to FIG. 7, the reference stroke of predetermined shape is determined beforehand according to the content of editing as the matching pattern. In the gesture command table 85b, a plurality of reference stroke data and command data are stored so that each pair of reference stroke data and command data has an association between them.

The output processing section 75 is composed of a text editing section 87 for editing a character or character string stored in a text memory 86. The text editing section 87 adds the character data corresponding to the character code to a cursor position in the text memory 86 when the text editing section 87 inputs the character code from the handwritten character recognizing section 84a. On the other hand, the text editing section 87 edits a character or character string in the text memory 86 corresponding to the editing position based on the command data when a gesture command and a processing code indicative of an editing position are inputted from the gesture command judging section 84b to the text editing section 87. The set gesture-content change processing section 76 is an important component of the present invention and it includes a keyboard 88 for key inputting character data, command data, etc. The set gesture-content change processing section 76 permits an association between each pair of the gesture command and the reference stroke in the gesture command table 85b to be changed by a key-operation (to be described later).

As shown in FIG. 15, the word processor of the present embodiment is provided with a trace drawing section 89 and a bit map memory 90. The trace drawing section 89 forms a trace image by connecting trace coordinates fetched from the trace coordinate fetching section 83. The bit map memory 90 synthesizes the trace image formed by the trace drawing section 89 and the image displayed on the display tablet 81 and stores the synthesized image. Thus, a character or a pattern which the user draws with the coordinate input pen 82 can be displayed on the display tablet 81 in real time.

In the above arrangement, respective operating methods for gesture editing, pointing and inputting of character by handwriting in the word processor of the present embodiment will be explained below in reference to FIG. 16(a) and FIG. 16(b) through FIG. 18(a) and FIG. 18(b).

Figure 16A:
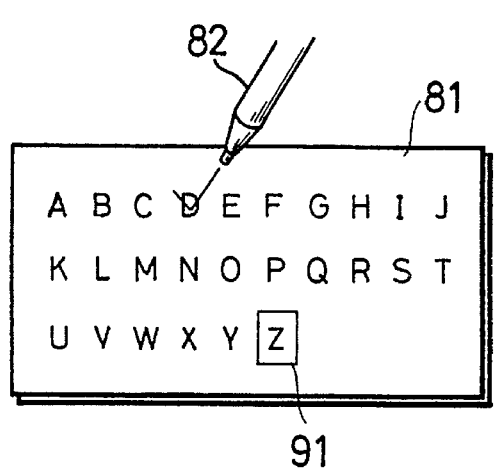
FIG. 16(a) and FIG. 16(b) are explanatory views which show concrete examples of gesture editing.

In the gesture editing operation, for example, as shown in FIG. 16(a), in the case of deleting one character "D" in the text displayed on the display tablet 81, first, a stroke is made in the shape like the character "V" with the coordinate input pen 82 on the character "D". Then, the coordinate input pen 82 is released from the display tablet 81.

As a result, the trace coordinates are fetched by the trace coordinate fetching section 83, and the trace coordinates are outputted to the trace drawing section 89 and the gesture command judging section 84b. The trace coordinates outputted to the trace drawing section 89 are converted into the trace image. Thereafter, the trace image is outputted to the bit map memory 90, thereby displaying a "V" like pattern so as to overlap the character "D" displayed on the display table 81.

Figure 16B:
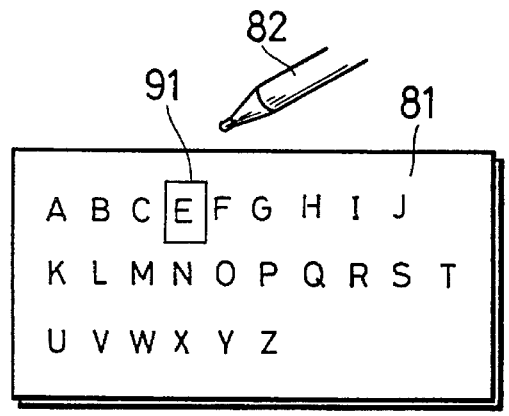

On the other hand, the trace coordinates outputted to the gesture command judging section 84b are collated with the data of the reference stroke stored in the gesture command table 85b. As a result, the command data and information indicative of position subjected to one character deletion are outputted to the text editing section 87. Then, the text editing section 87 moves the cursor 91 from the current position onto the character "D" as specified with the coordinate input pen 82 based on the information indicative of position. Thereafter, based on the command data for deleting one character, the character "D" in the text memory 86 is deleted. As a result, on the display tablet 81, as shown in FIG. 16(b), the character "D" is deleted, and the cursor is moved to the character "E" displayed next to the character "D".

Next, a pointing operation for specifying a plurality of characters on the display tablet 81, i.e., an area will be explained below. Conventionally, an on-screen area is specified by moving the cursor. In the word processor of the present invention, however, by pointing with the use of the coordinate input pen 82, the cursor position can be specified directly.

For example, as shown in FIG. 17(a), when the character "C" on the text is specified with the coordinate input pen 82, the gesture command judging section 84b determines that the trace coordinate outputted from the trace coordinate fetching section 83 is composed of a coordinate. As a result, a process is carried out for switching from gesture editing to pointing, and the cursor 91 is moved onto the character "C" so as to indicate the starting point of the specified area. Here, the gesture command judging section 84b does not collate the trace coordinate with the data of the reference stroke in the gesture command table 85b, and only the information indicative of position is outputted to the text editing section 87.

As shown in FIG. 17(b), after specifying the character "C", by specifying the character "Z" on the text with the coordinate input pen 82, the specifying of the ending position in the specified area is completed. As a result, an area located below and on the right of the character "C" and located above and on the left of the character "Z" is enclosed by short-dashed lines. The on-screen area is specified in the above manner.

Next, an input operation of the handwritten characters will be explained. A handwritten character input function input function may be set ON by a key-input operation using the keyboard 88 or by drawing a pattern of a triangle-like stroke on a display tablet 81.

When the handwritten character input function is set ON, as shown in FIG. 18(*a*), a wind W for handwritten character is displayed on a predetermined position on the display screen. For example, the character "M" is handwritten in the first input area W1 within the wind W with the coordinate input pen 82. Then, the second input area W2 is touched with the coordinate input pen 82 for inputting a next character.

As a result, the trace coordinates are fetched by the trace coordinate fetching section 83, and the trace coordinates are outputted to the trace drawing section 89 and the handwritten character recognizing section 84*a*. The trace coordinates outputted to the trace drawing section 89 are converted to the trace image. Thereafter, the trace image is outputted to the bit map memory 90. As a result, the character "M" is displayed in the first input area W1 within the wind W displayed on the display tablet 81.

On the other hand, the trace coordinates outputted to the handwritten character recognizing section 84*a* are collated with the matching pattern in the handwritten character table 85*a*. As a result, the recognized character code is outputted to the text editing section 87. Then, the character "M" as a recognized character is displayed on the cursor 91 on the display tablet 81 as shown in FIG. 18(*b*), and the cursor 91 is moved to the position next to the displayed character "M".

Next, gesture editing processes in the word processor of the present embodiment will be explained below in reference to the flow chart of FIG. 19.

First, it is judged whether or not set gesture-content in the gesture command table 85*b*, i.e., an association between each pair of the gesture command and the reference stroke is to be changed (S21). In S21, when the set gesture-content is to be changed, the sequence is moved onto S22, and after the process for changing the set gesture content is changed using the keyboard 88, the sequence moves back to S21. On the other hand, when the set gesture-content is not required to be changed, the sequence skips to S23 so as to carry out the input process by handwriting in the input processing section 71. The coordinate data (input pattern) obtained in the input processing section 71 is temporarily stored in a buffer memory (not shown) (S24).

Next, the matching pattern (reference stroke data) is invoked from the gesture command table 85*b* (S25). In the gesture command judging section 84*b*, the input pattern is collated with the matching pattern (S26) so as to determine whether or not the pattern (recognition pattern) corresponding to the input pattern exists (S27). If the recognition pattern does not exist in S27, the sequence moves back to S21. On the other hand, if the recognition pattern exists in S27, the sequence moves onto S28 where the command data corresponding to the recognition pattern is determined by searching the gesture command table 85*b*.

Then, the command data determined in the gesture command judging section 84*b* and information indicative of position are outputted to the text editing section 87 as a processing code (S29), and the text editing section 87 executes a command based on the processing code (S30). Then, the processes for gesture editing are terminated.

Next, processes for changing the set content of the gesture using the keyboard 88 in S22 will be explained below in reference to the flow chart of FIG. 20 and explanatory views of FIGS. 21(*a*)–(*c*).

First, by pressing a set gesture changing key provided on the keyboard 88, a content in the gesture command table 85*b* is invoked (S41), and a list of the current set gesture-content is displayed on the screen of the display tablet 81 as shown in FIG. 21(*a*) (S42). The set content is composed of set numbers, reference strokes and commands.

Next, when a set number (for example "1") representing an item to be changed is selected by the user (S43), as shown in FIG. 21(*b*), only the content corresponding to the set number "1" is displayed on the screen. From the screen, the user selects either a reference stroke or a command using a cursor moving key (←/→) as an item to be changed (S44). Thereafter, it is determined whether or not the item to be changed is a reference stroke (S45).

If not in S45, i.e., a command is to be changed, the sequence moves on to S46 where candidates for the command are displayed on the screen. On the other hand, if the item to be changed is the reference stroke, the sequence skips to S47, and candidates for the reference stoke excluding reference strokes in the previously set gesture-content are displayed on the screen. In this way, an overlapping setting of the reference stoke is not permitted, but an overlapping setting of command is permitted.

Thereafter, using a change/next candidate key, a specific candidate is selected (S48). Next, it is determined whether or not the selection of the specific candidate is confirmed (S49). In S49, if the selection of the specific candidate is not confirmed, the sequence is moved back to S48. On the other hand, if the selection is confirmed in S49, the sequence moves onto S50. Here, the selection is made confirmed as the user presses an execution key.

In S50, the set content of the data thus confirmed is maintained, and based on this, the content in the gesture command table 85*b* is changed (S51). Lastly, the set gesture-content after the change is displayed on the screen (S52) as shown in FIG. 21(*c*), thereby terminating the process for changing the set content.

Next, candidate tables for controlling so as to permit or not to permit the overlapping setting with respect to the reference stroke or command will be explained.

The candidate tables for the reference stroke and for the command are respectively stored in the gesture command table 85*b*. As shown in FIG. 22, the candidate table for the reference stroke stores therein 2-byte data in a form of a table. In the data, the first byte indicates check data which shows whether or not the data has been set, and the second data indicates a code corresponding to each reference stroke. On the other hand, the candidate table for the command stores therein 1-byte data in a form of a table as shown in FIG. 23. The 1-byte data indicates a code corresponding to each command such as "backspace", "line feed", "delete", etc.

Moreover, as shown in FIG. 24(*a*), the first byte data indicating the reference stroke and the second byte data indicating the number of the command are stored in the gesture command table 85*b*. The data stored in the gesture command table 85*b* is changed by the described operations for changing the set content, for example, as shown in FIG. 24(*b*).

As described, the word processor of the present embodiment is provided with the input processing section 71, the gesture command table 85*b* and the keyboard 88. The input processing section 71 is provided for inputting a trace of the pen drawn on the screen for the gesture editing as an input pattern. The gesture command table 85*b* stores therein matching patterns for recognizing the input pattern from the input processing section 71 and command data for editing corresponding to the matching pattern. The keyboard 88 is provided for changing the set association between each pair of the matching pattern and the command data stored in the gesture command table 85*b* as desired.

In the above arrangement, by a key-operation using the keyboard 88, the association between each pair of the command data for gesture editing and the matching pattern can be changed according to the use of the user. As a result, an operation efficiency of the information processing apparatus having a gesture editing function can be improved.

Additionally, the present invention is not limited to the above embodiment, other arrangements may be applicable within a scope of the present invention. For example, in the present embodiment, the set gesture-content change processing section 76 is composed of the keyboard 88. However, the present invention is not limited to this. For example, the association may be changed by an input process by handwriting using the display tablet 81.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An information processing apparatus having a gesture editing function comprising:

a display screen for displaying document information;

position indicating means for indicating a position on said display screen;

position detecting means for detecting a coordinate of a handwritten point or coordinates of a handwritten line drawing on said display screen, the handwritten point or line drawing being drawn using said position indicating means;

first memory means for storing a plurality of different coordinate systems used in computing a position of a displayed character or character string, wherein a position of a point of origin on the display screen of each different coordinate system differs depending on the coordinate system;

second memory means for storing reference strokes and edit instructions so as to have an association between each pair of reference strokes and edit instructions;

gesture judging means for judging a given edit instruction based on a result of a comparison between a shape of the handwritten line drawing and the reference stroke stared in said second memory means when an editing position for editing the document information is specified by the handwritten line drawing;

position computing means for selecting one of the different coordinate systems from said first memory means based on the given edit instruction and for computing a position of a character or character string corresponding to the editing position using a coordinate of the handwritten line drawing and the selected coordinate system; and document editing means for editing a character or character string at the computed position based on the given edit instruction.

2. The information processing apparatus having a gesture editing function as set forth in claim 1, wherein said first memory means includes a position coordinate table which stores a character position coordinate system for determining a coordinate of each character so that a peripheral portion of each character is considered as a same position as a center portion of each character and a space-between-characters position coordinate system for determining a coordinate of each space so that each space between characters is considered as a same position as a center of each space.

3. The information processing apparatus having a gesture editing function as set forth in claim 2, wherein the character position coordinate system and space-between-characters position coordinate system are respectively prepared in directions of row and column on said display screen, and wherein a coordinate system is selected from the character position coordinate system and the space-between-characters position coordinate system for the row direction and for the column direction on said display screen.

4. The information processing apparatus having a gesture editing function as set forth in claim 1, wherein said position indicating means includes a pen input device for use in specifying a position on said display screen by pointing and in inputting information by handwriting.

5. The information processing apparatus having a gesture editing function as set forth in claim 1, wherein said position detecting means includes a transparent digitizer of an electrostatic induction system or electromagnetic induction system, and said transparent digitizer is integrally provided on said display screen.

6. The information processing apparatus having a gesture editing function as set forth in claim 1, further comprising third memory means for storing therein a coordinate detected by said position detecting means, wherein said gesture judging means and position computing means respectively fetch coordinates from said third memory means.

7. The information processing apparatus having a gesture editing function as set forth in claim 6, wherein coordinates to be stored in said third memory means include coordinates of a position of a cursor displayed on said display screen.

8. The information processing apparatus having a gesture editing function as set forth in claim 6, wherein said coordinates of the position of the line drawing include a coordinate of a down-point at which said position indicating means touches on said display screen, a coordinate of an up-point at which said position indicating means is released from said display screen, and coordinates of drag points as a group of points which form a trace connecting the down-point and the up-point.

9. The information processing apparatus having a gesture editing function as set forth in claim 8, wherein said third memory means stores coordinates obtained by normalizing the coordinates of positions of the line drawing using absolute coordinates of the down-point as a standard point.

10. The information processing apparatus having a gesture editing function as set forth in claim 9, wherein said gesture judging means specifies a reference stroke which has the most similar shape to a shape of the line drawing shown by normalized coordinates by searching said second memory means so as to specify the given editing instruction.

11. The information processing apparatus having a gesture editing function as set forth in claim 1, wherein said second memory means includes a gesture table for storing therein reference strokes and edit instructions so as to have an association between each pair of reference stroke and edit instruction.

12. The information processing apparatus having a gesture editing function as set forth in claim 1, wherein said gesture judging means judges whether said position detecting means outputs the coordinates of a point specified by the pointing of said position indicating means or the coordinates of the handwritten line drawing.

13. The information processing apparatus having a gesture editing function as set forth in claim 1, wherein said gesture judging means sends the point coordinates to said document editing means without referring to said second memory means.

14. The information processing apparatus having a gesture editing function as set forth in claim 1, further comprising:

input means for inputting document information; and document information memory means for storing therein document information inputted by said input means and document information edited by said document editing means.

15. An information processing apparatus having a gesture editing function, comprising:

a display screen for displaying thereon a document;

display input means for inputting a shape of a handwritten line drawing on said display screen;

memory means for storing therein matching patterns for use in collating an input pattern of the handwritten line drawing inputted by said display input means and edit instructions for editing the document so as to have an association between each pair of matching pattern and edit instruction; and set content change means including a keyboard for changing as desired the association between each pair of the matching pattern and edit instruction in said memory means, said keyboard including a gesture setting change key for inputting an instruction for displaying associations between each pair of the matching pattern and edit instruction in a list on said display screen, a change operation key for selecting either a matching pattern or an edit instruction in the list, a change candidate key for selecting a specific candidate among a group of candidates for changing a matching pattern and an edit instruction, and an execution key for confirming a selection of the specific candidate, wherein an association between a first matching pattern and a first edit instruction is changed to an association between a second matching pattern and the first edit instruction when the first matching pattern is excluded from the group of candidates.

16. The information processing apparatus having a gesture editing function as set forth in claim 15, wherein:

said memory means includes a candidate table for matching pattern which stores therein 2-byte data in a form of a table, wherein the first byte of the data is a check data indicating whether or not a setting of an association between the matching pattern and the edit instruction has been completed, and the second byte of the data indicating a code corresponding to each matching pattern.

17. The information processing apparatus having a gesture editing function as set forth in claim 15, wherein said memory means is provided with a candidate table for an edit instruction, which stores therein 1-byte data which represents a code corresponding to each edit instruction.

18. The information processing apparatus having a gesture editing function as set forth in claim 15, further comprising recognition means having the following functions referring to said memory means:

(1) recognizing a matching pattern corresponding to an input pattern inputted by said display input means; and (2) specifying an edit instruction corresponding to the recognized matching pattern.

19. The information processing apparatus having a gesture editing function as set forth in claim 18, further comprising document editing means for editing a document being displayed on said display screen according to an edit instruction specified by said recognition means.

20. The information processing apparatus having a gesture editing function as set forth in claim 15, wherein said display input means includes a pen input device for use in specifying a position on said display screen by pointing and in inputting information by handwriting and a tablet device for detecting a coordinate of a handwritten point or coordinates of a handwritten line drawing on said display screen by said pen input device and for outputting coordinate information.

21. The information processing apparatus having a gesture editing function as set forth in claim 15, wherein said display input means includes a trace coordinate fetching section for fetching trace coordinates indicating a position of the handwritten line drawing on said display screen.

22. The information processing apparatus having a gesture editing function as set forth in claim 15, further comprising:

a trace drawing section for generating a trace image based on the trace coordinates; and a bit map memory for synthesizing the trace image and an image being displayed on said display screen and storing a synthesized image, wherein the handwritten line drawing is displayed on said display screen in real time.

23. An information processing apparatus having a gesture editing function, comprising:

a display screen for displaying thereon a document;

display input means for inputting a shape of a handwritten line drawing on said display screen;

memory means for storing therein matching patterns for use in collating an input pattern of the handwritten line drawing inputted by said display input means and edit instructions for editing the document so as to have an association between each pair of matching pattern and edit instruction;

set content change means including a keyboard for changing as desired the association between each pair of the matching pattern and edit instruction in said memory means, said keyboard including a gesture setting change key for inputting an instruction for displaying associations between each pair of the matching pattern and edit instruction in a list on said display screen, a change operation key for selecting either a matching pattern or an edit instruction in the list, a change candidate key for selecting a specific candidate among a group of candidates for changing a matching pattern and an edit instruction, and an execution key for confirming a selection of the specific candidate, wherein an association between a first matching pattern and a first edit instruction is changed to an association between a second matching pattern and the first edit instruction when the first matching pattern is excluded from the group of candidates;

wherein an association between a first matching pattern and a first edit instruction is changed to an association between the first matching pattern and a second edit instruction when the second edit instruction is included in the group of candidates.

* * * * *